US010711969B2

(12) United States Patent
Mochizuki

(10) Patent No.: US 10,711,969 B2
(45) Date of Patent: Jul. 14, 2020

(54) VEHICLE LAMP

(71) Applicant: KOITO MANUFACTURING CO., LTD., Tokyo (JP)

(72) Inventor: Mitsuyuki Mochizuki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/340,320

(22) PCT Filed: Oct. 3, 2017

(86) PCT No.: PCT/JP2017/035962
§ 371 (c)(1),
(2) Date: Apr. 8, 2019

(87) PCT Pub. No.: WO2018/066553
PCT Pub. Date: Apr. 12, 2018

(65) Prior Publication Data
US 2019/0257494 A1    Aug. 22, 2019

(30) Foreign Application Priority Data

Oct. 7, 2016   (JP) .................. 2016-198762
Oct. 7, 2016   (JP) .................. 2016-198763

(51) Int. Cl.
*F21S 41/683*   (2018.01)
*F21S 41/63*    (2018.01)
(Continued)

(52) U.S. Cl.
CPC .......... *F21S 41/683* (2018.01); *F21S 41/16* (2018.01); *F21S 41/176* (2018.01);
(Continued)

(58) Field of Classification Search
CPC ...... F21S 41/683; F21S 41/635; F21S 41/176; F21S 41/16; F21S 41/255; F21S 41/29; F21S 41/321; F21S 41/43; F21S 41/285
(Continued)

(56) References Cited

U.S. PATENT DOCUMENTS 5,068,768 A * 11/1991 Kobayashi .............. F21S 41/28
                                                   362/539
5,138,540 A *  8/1992 Kobayashi ............. B60Q 1/122
                                                   362/268
(Continued)

FOREIGN PATENT DOCUMENTS

JP    H03040303 A    2/1991
JP    2017-053057 A  3/2007
(Continued)

OTHER PUBLICATIONS

International Search Report issued in Application No. PCT/JP2017/035962, dated Dec. 19, 2017 (4 pages).
(Continued)

*Primary Examiner* — Bryon T Gyllstrom
(74) *Attorney, Agent, or Firm* — Osha Liang LLP

(57) ABSTRACT

A vehicle lamp includes a projection lens, and a light source disposed behind the projection lens. The vehicle lamp is configured to form a required light distribution pattern by irradiating light emitted from the light source forward through the projection lens. A movable lens configured to be movable in a required direction intersecting with an optical axis of the projection lens is disposed between the projection lens and the light source. A maximum luminous intensity position of the light distribution pattern is changed by moving the movable lens in the required direction.

12 Claims, 27 Drawing Sheets

(51) Int. Cl.

| | |
|---|---|
| *F21S 41/176* | (2018.01) |
| *F21S 41/16* | (2018.01) |
| *F21S 41/255* | (2018.01) |
| *F21S 41/29* | (2018.01) |
| *F21S 41/32* | (2018.01) |
| *F21S 41/43* | (2018.01) |
| *F21S 41/20* | (2018.01) |
| *F21S 41/689* | (2018.01) |
| *F21W 102/14* | (2018.01) |

(52) U.S. Cl.
CPC ........... *F21S 41/255* (2018.01); *F21S 41/285* (2018.01); *F21S 41/29* (2018.01); *F21S 41/321* (2018.01); *F21S 41/43* (2018.01); *F21S 41/635* (2018.01); *F21S 41/689* (2018.01); *F21W 2102/14* (2018.01)

(58) Field of Classification Search
USPC ........................................................ 362/512
See application file for complete search history.

(56) References Cited

U.S. PATENT DOCUMENTS

| | | | | |
|---|---|---|---|---|
| 5,317,486 A * | 5/1994 | Schmitt | ................... | B60Q 1/007 362/419 |
| 6,425,683 B1 * | 7/2002 | Kusagaya | ............... | F21S 41/43 362/512 |
| 2002/0071286 A1 * | 6/2002 | Taniuchi | ................. | F21V 11/08 362/514 |
| 2003/0193813 A1 * | 10/2003 | Collins | ................. | F21S 41/635 362/465 |
| 2004/0213012 A1 * | 10/2004 | Fukawa | ................... | B60Q 1/10 362/539 |
| 2005/0073849 A1 * | 4/2005 | Rhoads | ................... | F21S 9/022 362/296.1 |
| 2006/0171161 A1 * | 8/2006 | Oyama | ................... | F21S 41/43 362/539 |
| 2010/0033978 A1 * | 2/2010 | Ehm | ...................... | B60Q 1/085 362/465 |
| 2017/0009948 A1 * | 1/2017 | Yagi | ...................... | F21S 41/143 |
| 2017/0227184 A1 | 8/2017 | Ishida et al. | | |

FOREIGN PATENT DOCUMENTS

| | | |
|---|---|---|
| JP | 2013-145720 A | 7/2013 |
| JP | 2014-082124 A | 5/2014 |
| JP | 2015-082339 A | 4/2015 |
| JP | 2016-39021 A | 3/2016 |

OTHER PUBLICATIONS

Written Opinion issued in International Application No. PCT/JP2017/035962, dated Dec. 19, 2017 (4 pages).

Office Action issued in corresponding Japanese Application No. 2016-198762, dated May 20, 2020 (6 pages).

\* cited by examiner

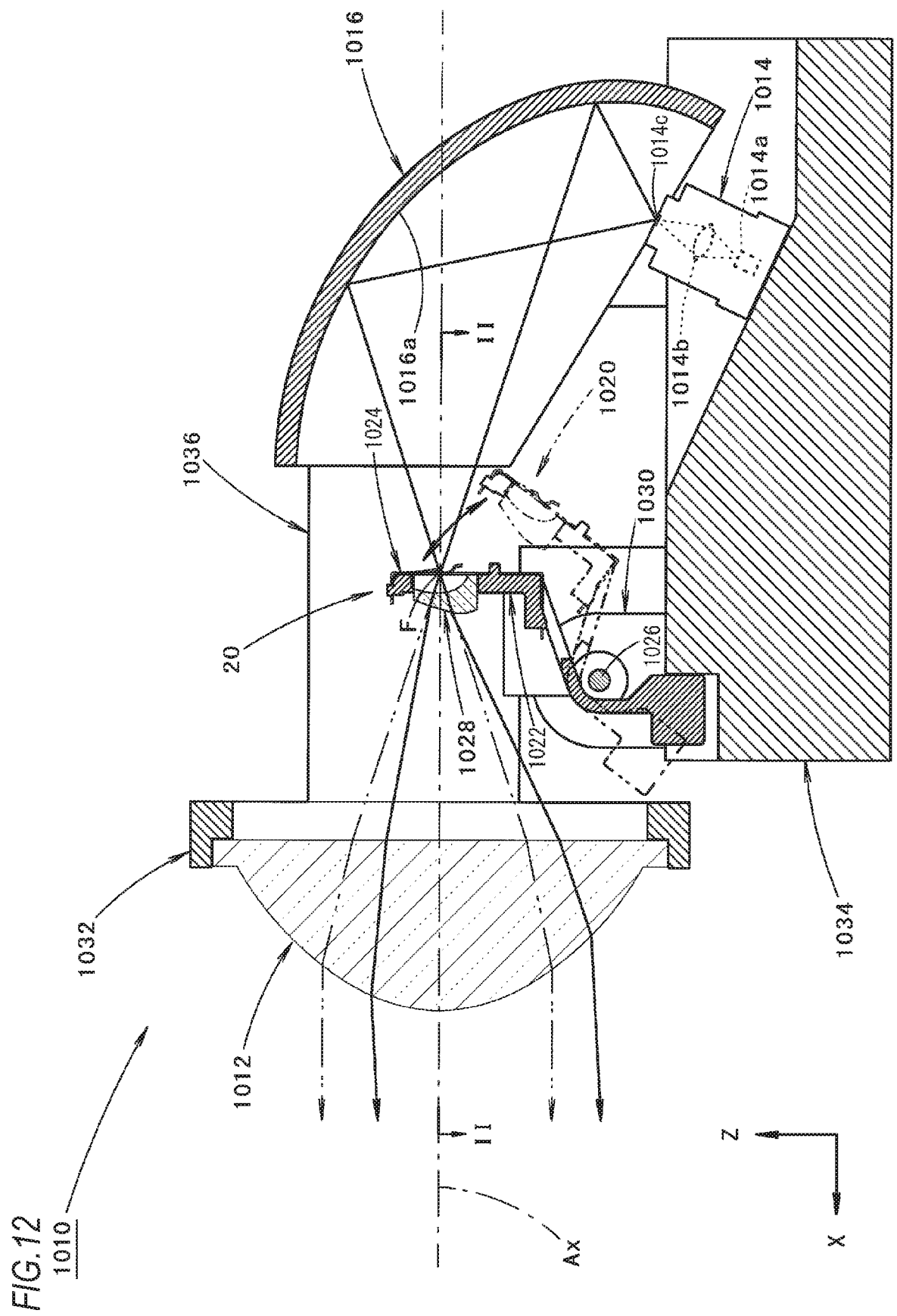

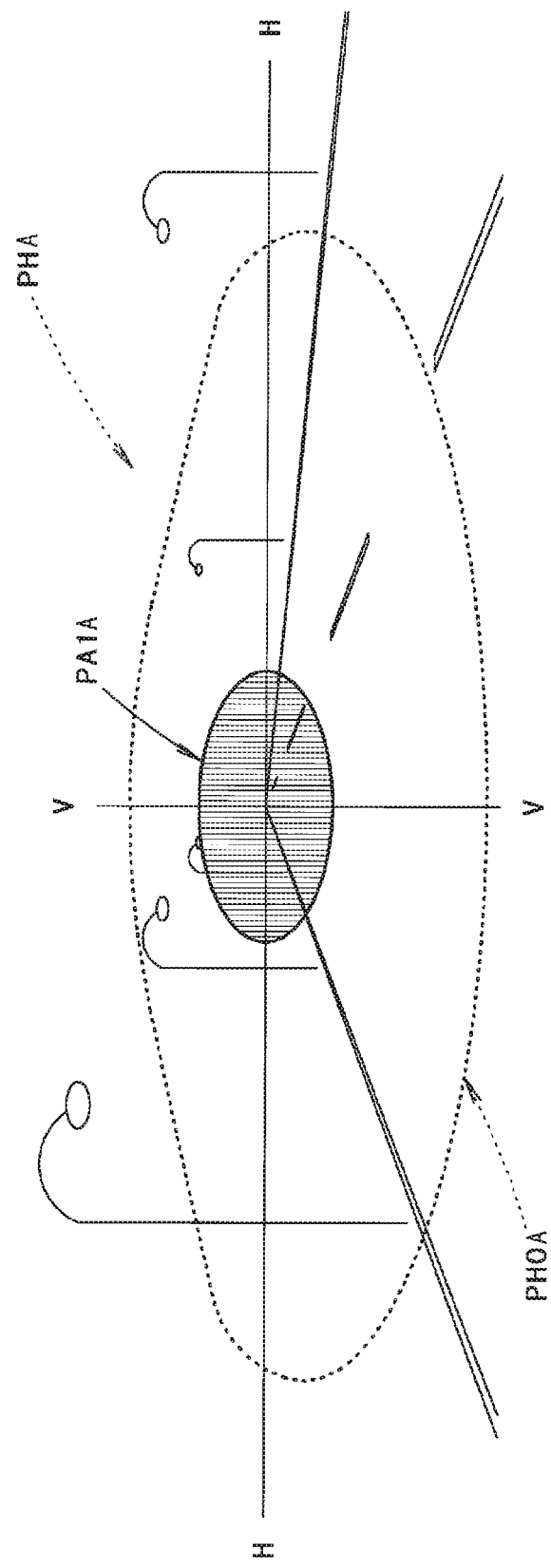

VEHICLE LAMP

CROSS-REFERENCE TO RELATED APPLICATIONS

This application is a national stage application of PCT/JP2017/035962 filed on Oct. 3, 2017, and claims priority to Japanese Patent Application No. JP-A-2016-198762 filed on Oct. 7, 2016, and JP-A-2016-198763 filed on Oct. 7, 2016, the contents of which are incorporated herein by reference in their entirety.

BACKGROUND

Technical Field

The disclosure relates to a projector type vehicle lamp.

Related Art

Conventionally, there is known a projector type vehicle lamp configured to irradiate light emitted from a light source disposed behind a projection lens toward the front through the projection lens.

Patent document 1 describes a configuration in which an auxiliary lens for controlling light emitted from the light source is disposed between the projection lens and the light source in such a vehicle lamp.

Further, Patent document 2 describes a configuration in which a movable shade configured to be able to adopt a light-shielding position in which a part of light emitted from the light source and directed to the projection lens is shielded and a light-shielding release position in which the shielding is released is disposed between the projection lens and the light source in such a vehicle lamp.

[Patent document 1] JP-A-2016-39021
[Patent document 2] JP-A-2015-82339

SUMMARY OF INVENTION

When the auxiliary lens is disposed between the projection lens and the light source as in the vehicle lamp described in the Patent document 1 it is possible to increase the degree of freedom in a shape of a light distribution pattern formed by light irradiated from the projection lens.

However, in the vehicle lamp described in the Patent document 1, the position of the auxiliary lens is fixed, and it is not possible to perform a fine light distribution control according to a vehicle travelling situation.

Further, in the vehicle lamp described in the Patent document 2, a light distribution pattern formed when the movable shade is in the light-shielding position is formed as a light distribution pattern whose lateral width is smaller than that of a light distribution pattern formed when the movable shade is in the light-shielding release position. At this time, it is possible to perform a road surface drawing (that is, to intentionally form a pattern of light on the road surface) by light irradiated on the road surface in front of the vehicle.

However, in the vehicle lamp described in the Patent document 2, the shape of the light distribution pattern is changed by the movement of the movable shade, but the formation position thereof is not changed. Therefore, it is not possible to efficiently perform light irradiation on the road surface in front of the vehicle.

One or more embodiments in the present disclosure provides a projector type vehicle lamp capable of performing a fine light distribution control according to a vehicle travelling situation.

One or more embodiments in the present disclosure provides a projector type vehicle lamp capable of forming light distribution patterns of different shapes and efficiently performing light irradiation on the road surface in front of the vehicle.

One or more embodiments in the present disclosure adopts a configuration having a predetermined movable lens.

A vehicle lamp of the present disclosure comprises: a projection lens; and a light source disposed behind the projection lens, wherein the vehicle lamp is configured to form a required light distribution pattern by irradiating light emitted from the light source forward through the projection lens, wherein a movable lens configured to be movable in a required direction intersecting with an optical axis of the projection lens is disposed between the projection lens and the light source, and wherein a maximum luminous intensity position of the light distribution pattern is changed by moving the movable lens in the required direction.

The specific configuration of the "required light distribution pattern" is not particularly limited.

The type of the "light source" is not particularly limited. For example, a light emitting element such as a light emitting diode or a laser diode, or a light source bulb, or the like can be adopted.

A specific mode of the movement of the "movable lens" is not particularly limited, as long as it is configured to be movable in a required direction intersecting with the optical axis of the projection lens. For example, the movement by linear reciprocating motion or the movement by pivotal motion or the like can be adopted.

A specific direction of the "required direction" is not particularly limited, as long as it intersects with the optical axis of the projection lens.

One or more embodiments of the present disclosure adopts a configuration including a predetermined light control unit.

A vehicle lamp of the present disclosure comprises: a projection lens; and a light source disposed behind the projection lens, wherein the vehicle lamp is configured to form a first light distribution pattern by irradiating light emitted from the light source forward through the projection lens, wherein a first light control unit configured to be able to shield a part of light which is emitted from the light source and which is directed to the projection lens is disposed between the projection lens and the light source, wherein a second light distribution pattern having a lateral width smaller than a lateral width of the first light distribution pattern is formed by a light-shielding action of the first light control unit, and wherein the vehicle lamp comprises a second light control unit configured to displace a formation position of the second light distribution pattern downward when a light-shielding by the first light control unit is performed.

The specific shape of the "first light distribution pattern" is not particularly limited.

The type of the "light source" is not particularly limited. For example, a light emitting element such as a light emitting diode or a laser diode, or a light source bulb, or the like can be adopted.

A specific configuration of the "first light control unit" is not particularly limited, as long as it can shield a part of light emitted from the light source and directed to the projection lens. For example, a movable shade or a liquid crystal shutter or the like can be adopted.

A specific configuration of the "second light control unit" is not particularly limited, as long it can displace the formation position of the second light distribution pattern toward the lower side when the shielding by the first light control unit is performed. For example, a deflection lens or a leveling device or the like can be adopted.

The vehicle lamp according to the disclosure is configured as a projector type vehicle lamp configured to form a required light distribution pattern. Further, as the movable lens disposed between the projection lens and the light source moves in a required direction, the maximum luminous intensity position of the light distribution pattern is changed. In this way, the following operational effects can be obtained.

That is, the maximum luminous intensity position of the light distribution pattern can be changed according to the movement position of the movable lens, and accordingly, the formation position and light distribution of the light distribution pattern can be changed. Therefore, it is possible to perform a fine light distribution control according to a vehicle travelling situation.

In this manner, according to the disclosure, it is possible to perform a fine light distribution control according to a vehicle travelling situation in the projector type vehicle lamp.

In the above configuration, by adopting a configuration in which a spot-like light distribution pattern is formed as the required light distribution pattern, it is possible to perform a fine light distribution control according to a vehicle travelling situation while improving the distant visibility by this light distribution pattern.

In the above configuration, by adopting a configuration in which the maximum luminous intensity position is changed in the right and left direction by the movement of the movable lens, the formation position of the light distribution pattern at the time of straight travelling and curved travelling can be changed in the right and left direction. In this way, light irradiation adapted to the road shape or the like can be performed.

In the above configuration, by adopting a configuration in which a shade for shielding a part of light emitted from the light source and directed to the movable lens is fixed to the movable lens, the shape of the light distribution pattern can be also changed according to a vehicle travelling situation.

Further, the presence of the shade makes it possible to reduce the possibility of giving a glare to a driver of a preceding vehicle, a driver of an oncoming vehicle, or a crossing pedestrian or the like.

At that time, by adopting a configuration in which a longitudinally elongated slit is formed in this shade, a band of light linearly extending forward can be formed on the road surface in front of the vehicle, thereby enhancing the calling attention function for a crossing pedestrian or the like.

In the above configuration, by adopting a configuration in which a reflector for reflecting light emitted from the light source toward the projection lens is provided and the reflector is configured to reflect light emitted from the light source toward the vicinity of a rear focus point of the projection lens, it is possible to easily form a spot-like light distribution pattern as a required light distribution pattern.

Further, the vehicle lamp according to the disclosure is configured as a projector type lamp so as to form the first light distribution pattern. In addition, the second light distribution pattern having a lateral width smaller than that of the first light distribution pattern can be formed by the light-shielding action of the first light control unit disposed between the projection lens and the light source, and the formation position of the second light distribution pattern can be displaced downward by the second light control unit when the light-shielding is performed. In this way, the following operational effects can be obtained.

That is, since the second light distribution pattern having a lateral width smaller than that of the first light distribution pattern is formed by the light-shielding action of the first light control unit and the formation position thereof is displaced downward by the second light control unit, it is possible to efficiently perform the light irradiation on the road surface in front of the vehicle, as compared with the light distribution pattern in which only a part of the first light distribution pattern is cut off.

In this manner, according to the disclosure, it is possible to form light distribution patterns of different shapes and efficiently perform light irradiation on the road surface in front of the vehicle in the projector type vehicle lamp.

Further, since the formation position of the second light distribution pattern is displaced downward in this manner, it is possible to easily perform the road surface drawing by light irradiation on the road surface in front of the vehicle, and it is possible to reduce the possibility of giving a glare to a driver of a preceding vehicle, a driver of an oncoming vehicle, or a crossing pedestrian or the like.

In the above configuration, by adopting a configuration in which a spot-like light distribution pattern is formed as the first light distribution pattern, the distant visibility can be improved by the first light distribution pattern, and the road surface in front of the vehicle can be locally brightly irradiated by the second light distribution pattern.

In the above configuration, by adopting a configuration in which a longitudinally elongated band-like light distribution pattern in which both right and left side portions of the first light distribution pattern are cut off is formed as the second light distribution pattern, a band of light linearly extending forward can be formed as the road surface drawing on the road surface in front of the vehicle by the second light distribution pattern, thereby enhancing the calling attention function to the surroundings.

At that time, by adopting a configuration in which a light distribution pattern in which the lateral width of the upper region is larger than the lateral width of the lower region is formed as the longitudinally elongated band-like light distribution pattern, it is possible to enhance the calling attention function for a pedestrian or the like crossing the front of the vehicle by the light in the upper region.

In the above configuration, by adopting a configuration in which the first light control unit is configured by the movable shade configured to be able to adopt the light-shielding position and the light-shielding release position, it is possible to selectively form the first light distribution pattern and the second light distribution pattern with a simple configuration.

In this case, by adopting a configuration in which the second light control unit is configured by the deflection lens fixed to the movable shade, the formation position of the second light distribution pattern can be displaced downward with a simple configuration.

BRIEF DESCRIPTION OF DRAWINGS

FIG. 12 is a side sectional view showing a vehicle lamp according to a second embodiment of the disclosure;

FIG. 17A is a view showing a light distribution pattern formed by irradiation light from the vehicle lamp and showing a first light distribution pattern;

DETAILED DESCRIPTION

Hereinafter, embodiments of the disclosure will be described with reference to the drawings. In embodiments in the present disclosure, numerous specific details are set forth in order to provide a more thorough understanding of the disclosure. However, it will be apparent to one of ordinary skill in the art that these specific details are not required. In other instances, well-known features have not been described in detail.

Figure 1:
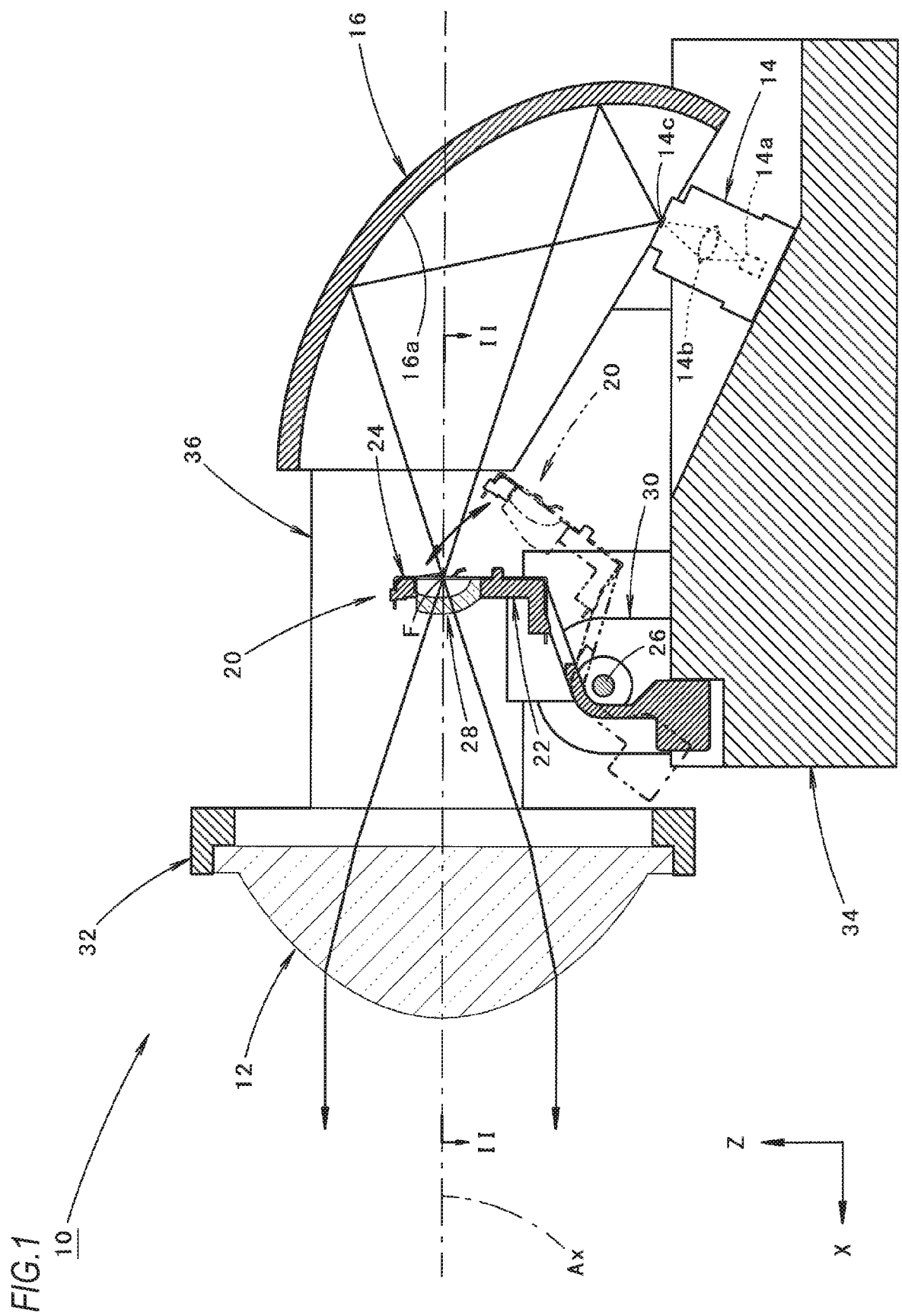
FIG. 1 is a side sectional view showing a vehicle lamp according to a first embodiment of the disclosure.
Figure 2:
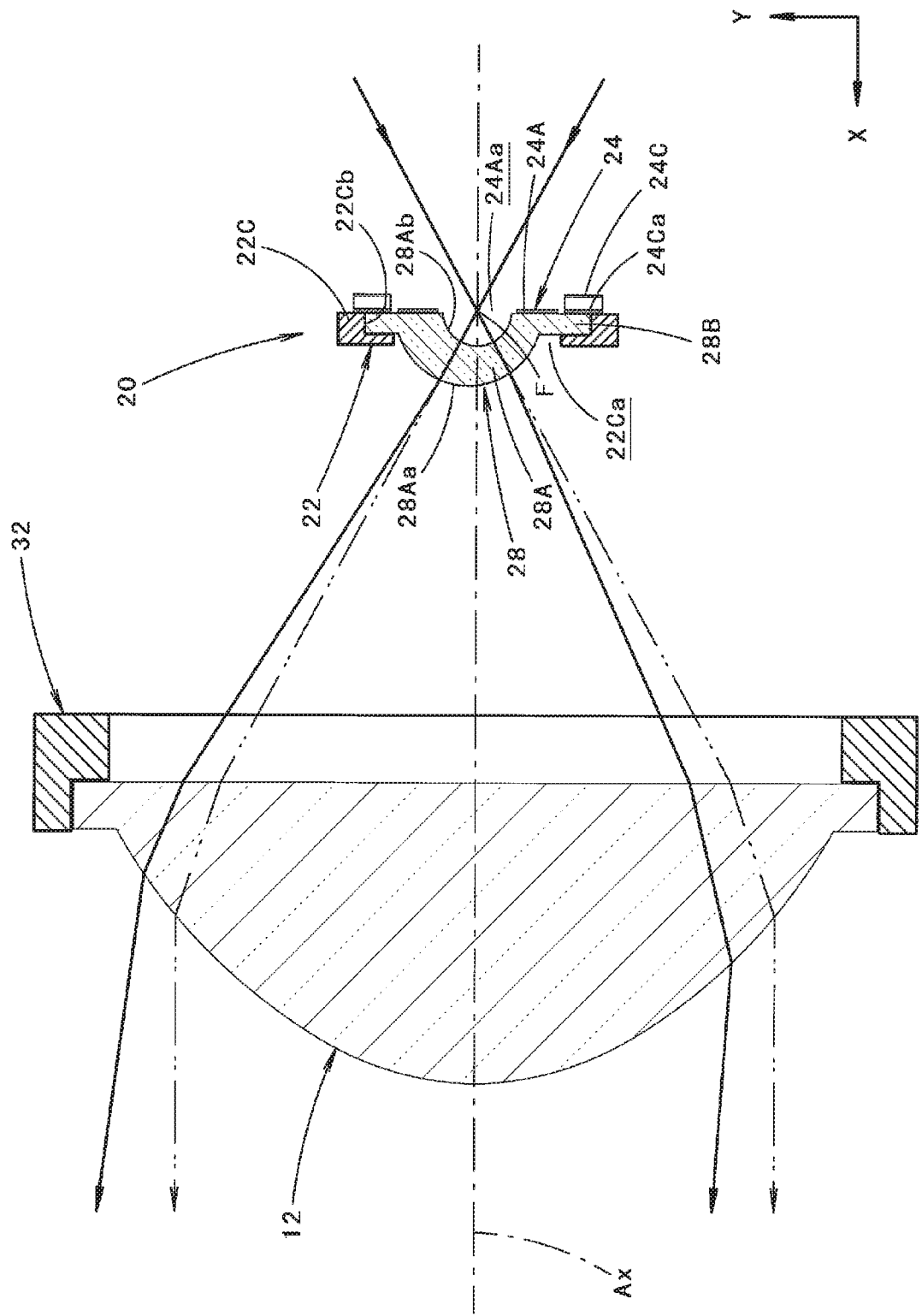
FIG. 2 is a sectional view taken along the line II-II in FIG. 1.

FIG. 1 is a side sectional view showing a vehicle lamp 10 according to a first embodiment of the disclosure, and FIG. 2 is a sectional view taken along the line II-II in FIG. 1. Meanwhile, in FIGS. 1 and 2, the direction indicated by X is the "front" of the lamp (also the "front" of the vehicle), the direction indicated by Y is the "right direction," and the direction indicated by Z is the "upper direction." The same is applied to other figures.

As shown in FIGS. 1 and 2, the vehicle lamp 10 according to the present embodiment is a projector type lamp unit used in a state of being incorporated as a part of a headlamp. The vehicle lamp 10 includes a projection lens 12, a light source unit 14 disposed on the rear side of a rear focus point F of the projection lens 12, a reflector 16 configured to reflect light emitted from the light source unit 14 toward the projection lens 12, and a movable lens 20 disposed between the light source unit 14 and the projection lens 12.

The projection lens 12 is a plano-convex aspheric lens having a front convex surface and a rear flat surface. The projection lens 12 is configured to project a light source image formed on a rear focal plane that is a focal plane including a rear focus point F thereof, as an inverted image, on a virtual vertical screen in front of the lamp. The projection lens 12 is supported by a lens holder 32 at its outer peripheral flange portion. The lens holder 32 is supported by a base member 34 via a pair of right and left brackets 36.

The light source unit 14 is configured so that light emitted from a laser diode 14a as a light source is focused on a light emitting portion 14c made of a phosphor by a condenser lens 14b and is emitted as white diffused light from the light emitting portion 14c. At that time, the emission light from the light source unit 14 is set such that the emitted light from the center position of the light emitting portion 14c has the highest luminous intensity. The light emitting portion 14c of the light source unit 14 has a circular surface shape. The light source unit 14 is supported on the base member 34 in a state where the surface thereof is oriented in a direction inclined rearward with respect to the vertical upper side.

The reflector 16 is supported by a pair of right and left brackets 36 in a state of being disposed so as to cover the light source unit 14 from the upper side. A reflecting surface 16a of the reflector 16 is configured by a spheroidal surface in which the light emission center of the light emitting portion 14c of the light source unit 14 is a first focus and the rear focus point F of the projection lens 12 is a second focus. In this way, the reflector 16 condenses light emitted from the light source unit 14 in the vicinity of the rear focus point F of the projection lens 12.

The movable lens 20 includes a deflection lens 28 for changing the direction of light reflected from the reflector 16 and a lens holder 22 for supporting the deflection lens 28 via a metal holder 24.

The lens holder 22 is pivotably supported by an actuator (e.g., solenoid, etc.) 30 via a pivot pin 26. At that time, the pivot pin 26 is disposed to extend in a right and left direction below an optical axis Ax and in front of the rear focus point F, and both ends of thereof are supported by the actuator 30 and a support bracket (not shown). The actuator 30 and the support bracket are supported on the base member 34.

The movable lens 20 can adopt a light control position (position indicated by a solid line in FIG. 1) and a retracted position (position indicated by a two-dot chain line in FIG. 1) pivoted rearward by a predetermined angle from the light control position by the driving of the actuator 30. The actuator 30 is driven when an operation of a beam selector switch (not shown) is performed.

Figure 3:
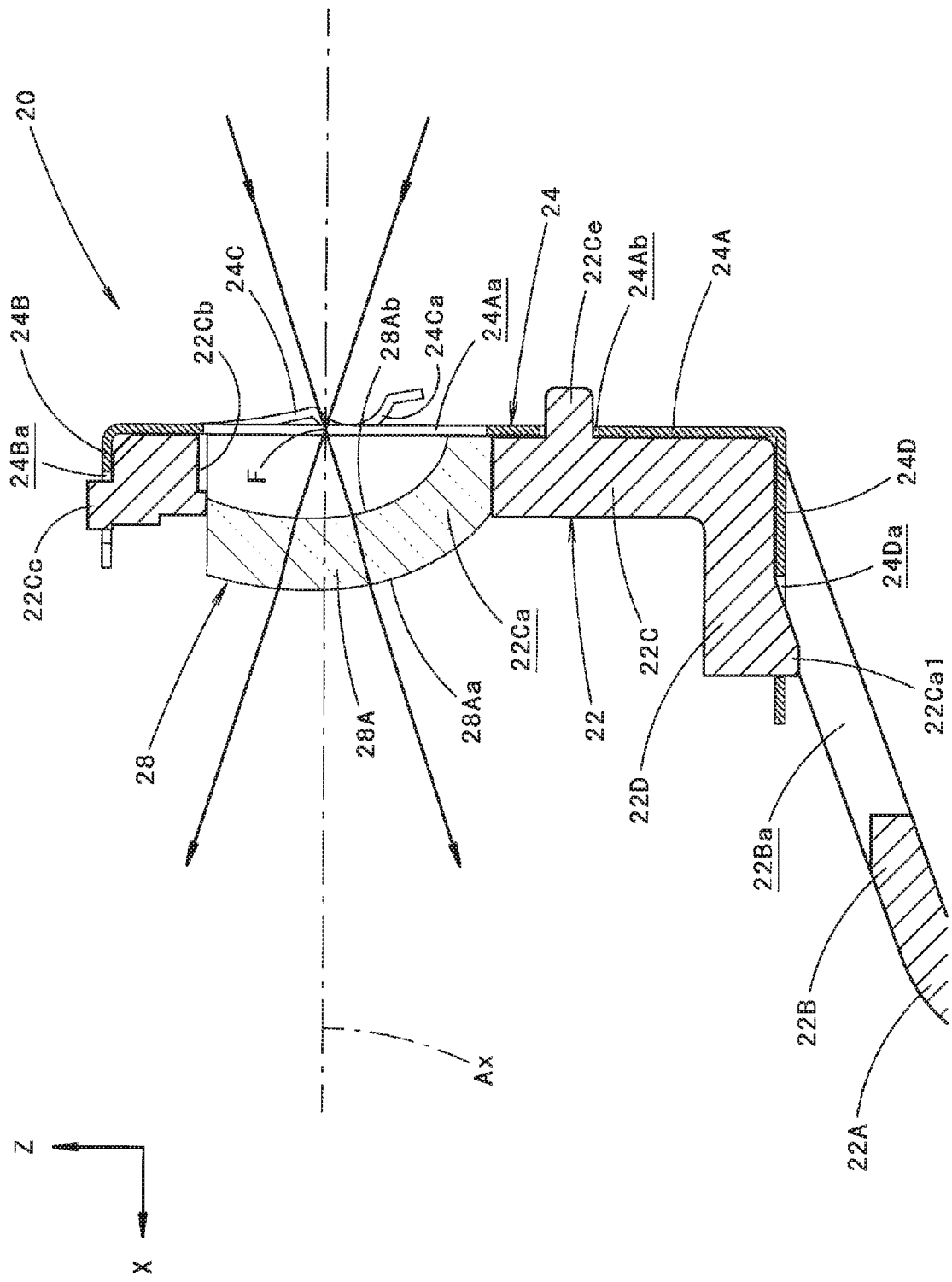
FIG. 3 is a detailed view of a main part of FIG. 1, showing main components of the vehicle lamp according to the first embodiment.

FIG. 3 is a detailed view of a main part of FIG. 1, showing main components of the vehicle lamp 10 according to the first embodiment.

Figure 4:
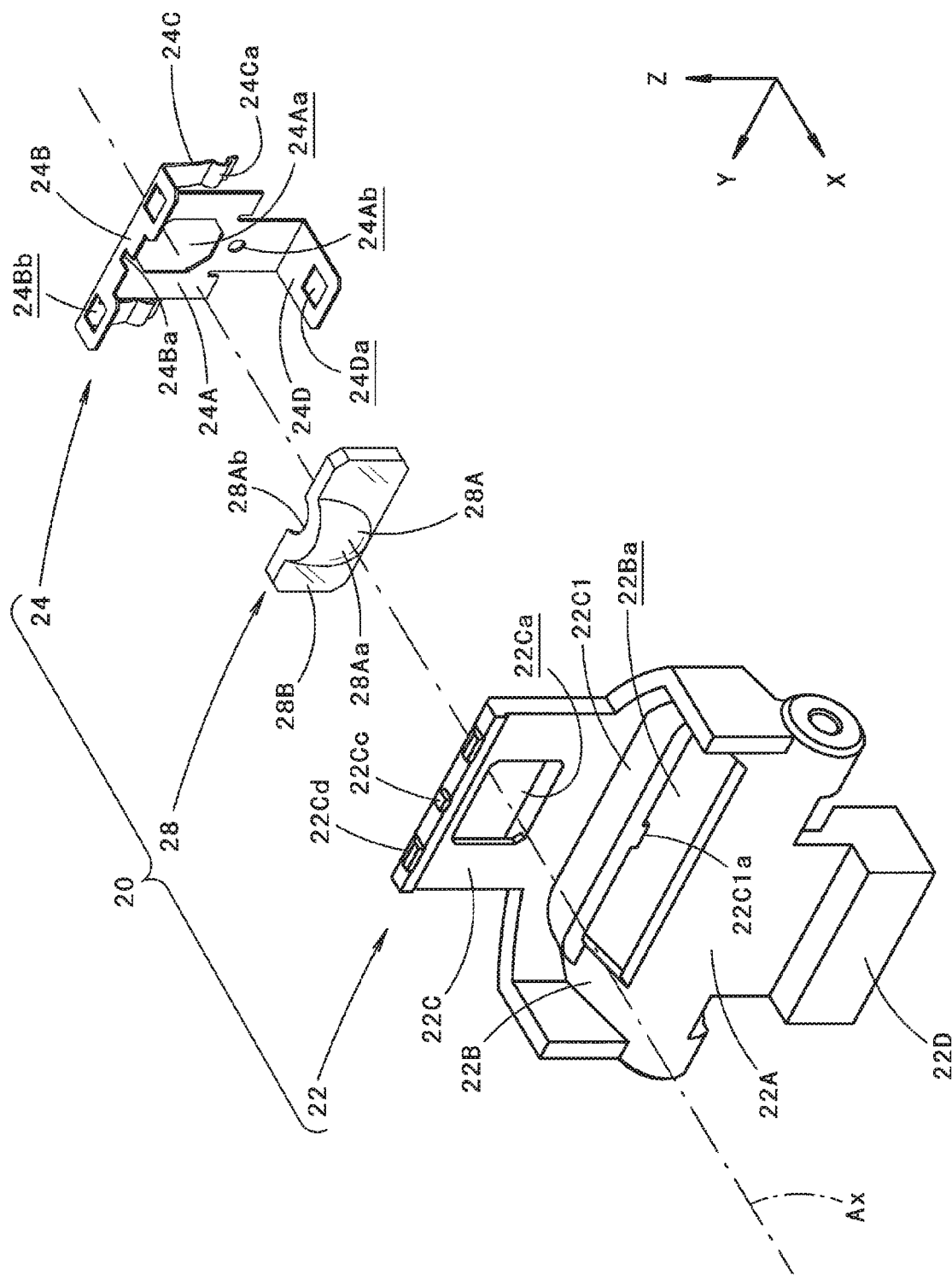
FIG. 4 is a perspective view showing the main components in a disassembled state, as seen diagonally from the upper front side.
Figure 5:
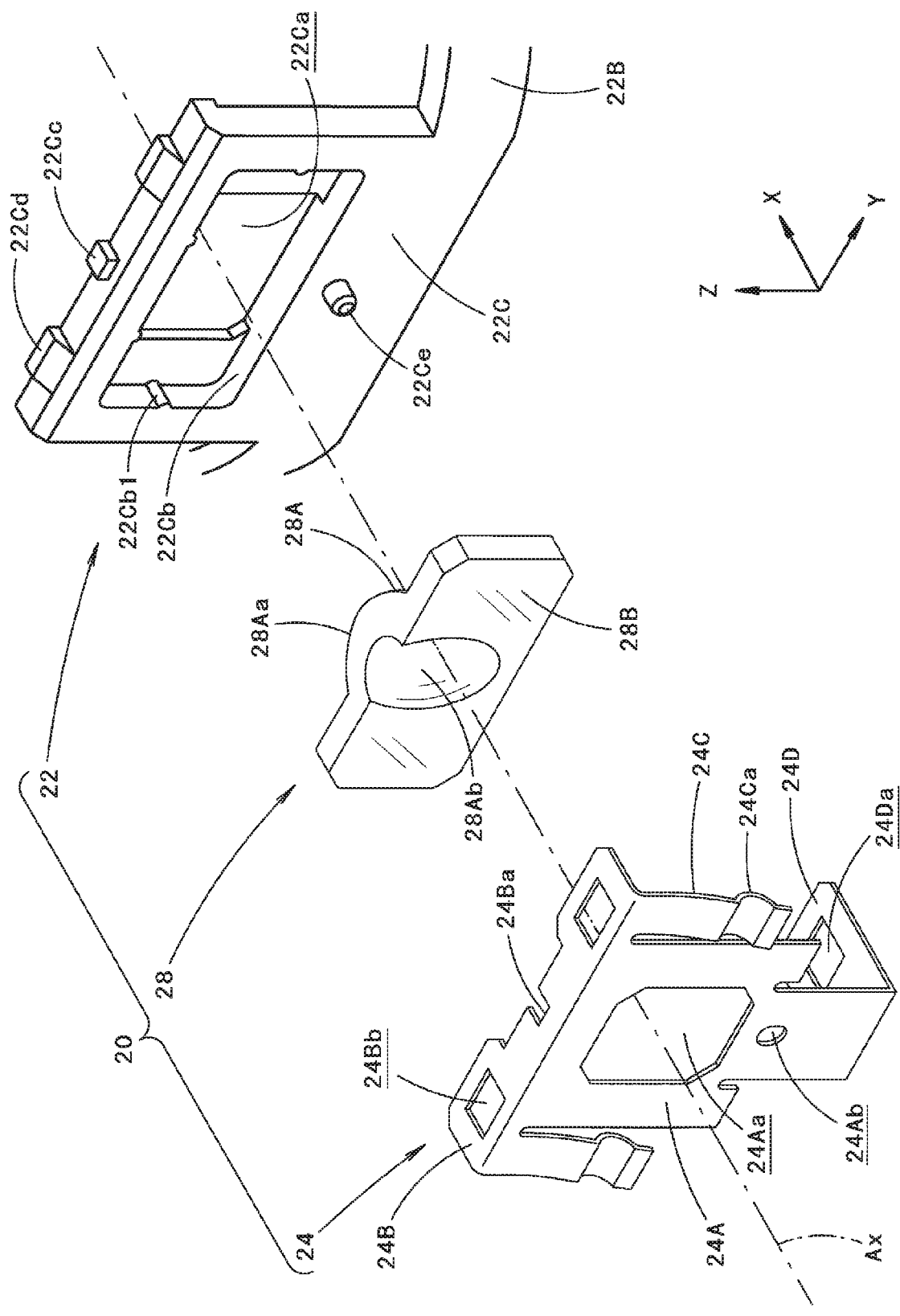
FIG. 5 is a perspective view showing the main components in a disassembled state, as seen diagonally from the upper rear side.

Further, FIGS. 4 and 5 are perspective views showing a state in which the main components of the vehicle lamp 10 are disassembled into respective elements. FIG. 4 is a perspective view showing the deflection lens 28, the lens holder 22 and the metal holder 24 constituting the movable lens 20 as seen diagonally from the upper front side, and FIG. 5 is a perspective view showing these elements as seen diagonally from the upper rear side.

As shown in FIGS. 3 to 5, the lens holder 22 is a die-cast molded product and has a pivot pin supporting portion 22A for supporting the pivot pin 26, an inclination portion 22B extending obliquely upward and rearward from the pivot pin supporting portion 22A, an upright wall portion 22C extending vertically upward from a rear end edge of the inclination portion 22B, and a counterweight portion 22D extending downward from the pivot pin supporting portion 22A. The inclination portion 22B is extended to both right and left sides and curved forward from the position below the optical axis Ax, in a plan view. Further, the upright wall portion 22C and the counterweight portion 22D are formed to have a lateral width narrower than the pivot pin supporting portion 22A and the inclination portion 22B.

Further, an opening portion 22Ba penetrating the inclination portion 22B in the front and rear direction is formed in the inclination portion 22B, and an opening portion 22Ca penetrating the upright wall portion 22C in the front and rear direction is also formed in the upright wall portion 22C. The opening portion 22Ba has a substantially rectangular opening shape which is laterally elongated. On the other hand, the opening portion 22Ca has a substantially rectangular opening shape slightly laterally elongated and is formed to surround the optical axis Ax.

A horizontal portion 22C1 extending forward along a horizontal plane is formed at a lower end portion of the upright wall portion 22C. A protrusion 22C1a protruding downward so as to face the opening portion 22Ba is formed at the center portion in the right and left direction on the lower surface of the horizontal portion 22C1.

A rectangular concave portion 22Cb spreading from the opening portion 22Ca toward the right and left sides is formed on the rear surface of the upright wall portion 22C. Beads 22Cb1 extending in the front and rear direction are formed on the right and left wall surfaces and upper surface of the rectangular concave portion 22Cb.

An upper end surface of the upright wall portion 22C extends along the horizontal plane. A protrusion 22Cc is formed at the central portion of the upper end surface in the right and left direction, and protrusions 22Cd are formed at portions near both ends thereof in the right and left direction.

A columnar pin 22Ce protruding rearward is formed at a portion in the vicinity below the opening portion 22Ca in the center portion of the rear surface of the upright wall portion 22C in the right and left direction.

The metal holder 24 is a member formed by processing a metal plate having a spring property and has a bilaterally-symmetrical shape with respect to the optical axis Ax.

The metal holder 24 has a vertical surface portion 24A extending along the vertical plane orthogonal to the optical axis Ax, an upper surface portion 24B extending forward from an upper end edge of the vertical surface portion 24A, leaf spring portions 24C extending downward from a rear end edge of the upper surface portion 24B on both right and left sides of the vertical surface portion 24A, and a lower surface portion 24D extending forward from a lower end edge of the vertical surface portion 24A.

The vertical surface portion 24A is formed to have substantially the same vertical width as the upright wall portion 22C of the lens holder 22 and formed to have substantially the same lateral width as the opening portion 22Ca of the upright wall portion 22C.

An opening portion 24Aa with a shape close to a square is formed in the center portion of the vertical surface portion 24A in the right and left direction. The opening portion 24Aa is formed to have substantially the same height as the vertical width of the deflection lens 28.

An elongated hole 24Ab slightly longer in the upper and lower direction is formed in the vicinity below the opening portion 24Aa of the vertical surface portion 24A.

The upper surface portion 24B extends along the horizontal plane. A rectangular notch portion 24Ba is formed at the center portion of the upper surface portion in the right and left direction, and rectangular opening portions 24Bb are formed at portions near both ends thereof in the right and left direction.

Each leaf spring portion 24C is extended downward and curved rearward. A semi-cylindrical portion 24Ca, which has a semi-cylindrical shape extending in the right and left direction and protrudes forward, is formed at a portion in the vicinity of a lower end of each leaf spring portion 24C.

The lower surface portion 24D extends along the horizontal plane, and a rectangular opening portion 24Da is formed at a portion in the vicinity of a front end thereof.

The deflection lens 28 is a lens made of resin, and has a lens body portion 28A and a pair of flange portions 28B extending to both right and left sides from the lens body portion 28A. The deflection lens 28 has a bilaterally-symmetrical shape with respect to the optical axis Ax.

The pair of right and left flange portions 28B is formed to extend in a flat plate along the vertical plane orthogonal to the optical axis Ax. The lens body portion 28A is formed to protrude forward from both flange portions 28B.

The lens body portion 28A has a front surface 28Aa formed in a convex curved surface shape and a rear surface 28Ab formed in a concave curved surface shape. The rear surface 28Ab of the lens body portion 28A is configured by a curved surface substantially along a longitudinally elongated elliptical surface centered on a point positioned slightly above the optical axis Ax. The front surface 28Aa of the lens body portion 28A is configured by a curved surface in which a region on the right side of the optical axis Ax bulges forward.

That is, the lens body portion 28A is formed so that its thickness is constant in the vertical cross-section but its thickness gradually increases from a left end edge to a right end edge in the horizontal cross-section.

In this manner, the deflection lens 28 deflects light reflected from the reflector 16 to the right side by a certain angle. The rightward deflection amount at that time is set to about 2 to 4° (e.g., about 3°).

The metal holder 24 and the deflection lens 28 are attached to the upright wall portion 22C of the lens holder 22. This attachment is carried out as follows.

That is, first, the deflection lens 28 is inserted into the opening portion 22Ca of the upright wall portion 22C of the lens holder 22 from the rear side, and both flange portions 28B are abutted against the rectangular concave portion 22Cb. In this manner, the lens body portion 28A protrudes forward from the opening portion 22Ca of the upright wall portion 22C.

Subsequently, the notch portion 24Ba formed in the upper surface portion 24B of the metal holder 24 is engaged with the protrusion 22Cc formed in the upper end surface of the upright wall portion 22C to perform the positioning in the right and direction, and the pair of right and left opening portions 24Bb formed in the upper surface portion 24B is engaged with the pair of right and left protrusions 22Cd formed in the upper end surface of the upright wall portion 22C.

Subsequently, the semi-cylindrical portions 24Ca of the pair of right and left leaf spring portion 24C are pressed against the flange portions 28B of the deflection lens 28, thereby elastically deforming each of the leaf spring portions 24C.

Then, the opening portion 24Da formed in the lower surface portion 24D of the metal holder 24 is engaged with the protrusion 22C1a formed in the lower surface of the horizontal portion 22C1 of the upright wall portion 22C to fix the metal holder 24 to the lens holder 22. In this way, the deflection lens 28 is positioned by being clamped by the metal holder 24 and the lens holder 22 from both front and rear sides.

When the movable lens 20 is in the light control position, the vertical surface portion 24A of the metal holder 24 is arranged to extend along the vertical plane orthogonal to the optical axis Ax and, at this time, the center position of the opening portion 24Aa is positioned slightly below the rear focus point F of the projection lens 12.

Further, when the movable lens 20 is in the light control position, light reflected from the reflector 16 is deflected to the right side by the deflection lens 28, and then, reaches the projection lens 12. On the other hand, when the movable lens 20 is in the retracted position, light reflected from the reflector 16 directly reaches the projection lens 12.

Figure 6A:
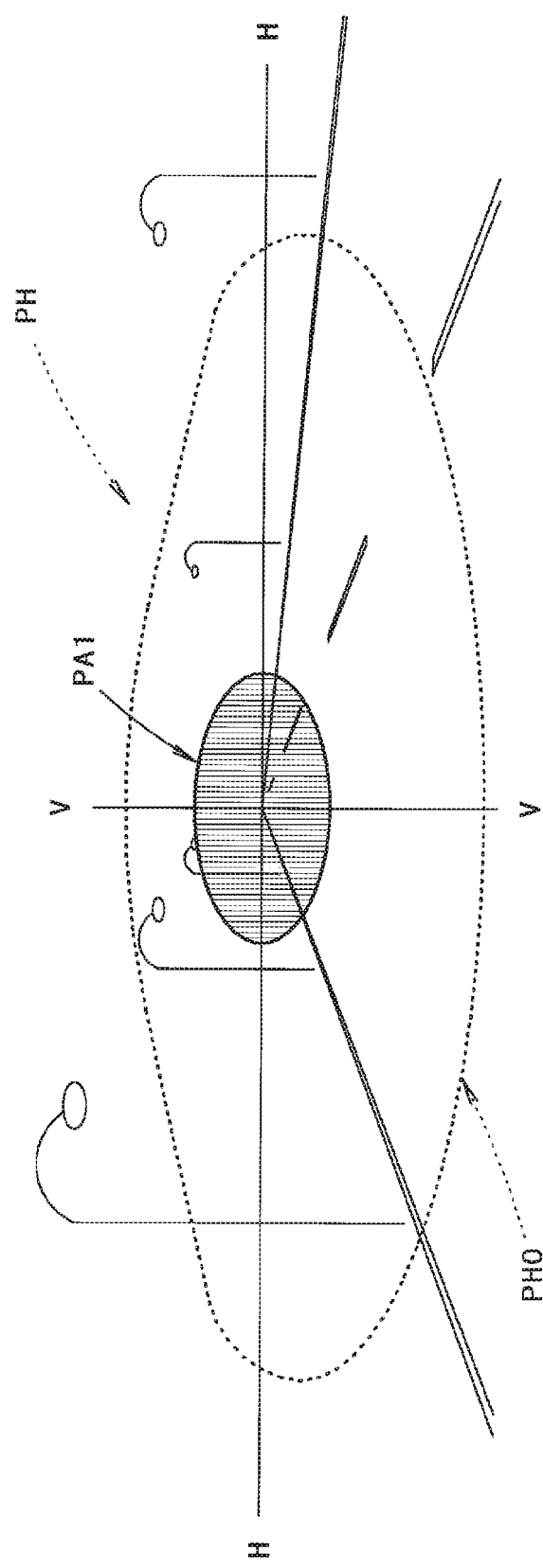
FIG. 6A is a view showing a light distribution pattern formed by irradiation light from the vehicle lamp and showing a light distribution pattern formed when a movable lens is in a retracted position.
Figure 6B:
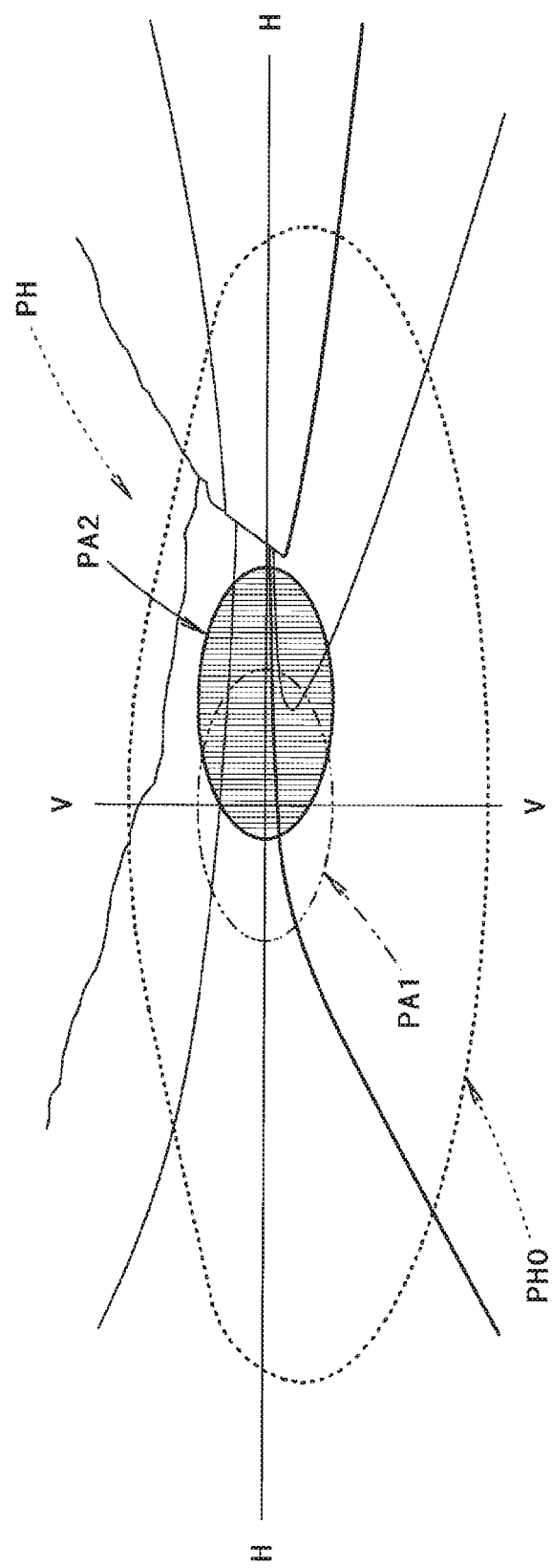
FIG. 6B is a view showing a light distribution pattern formed by irradiation light from the vehicle lamp and showing a light distribution pattern formed when the movable lens is in a light control position.

FIGS. 6A and 6B are views perspectively showing a light distribution pattern formed on a virtual vertical screen disposed at a position of 25 m in front of the lamp by light irradiated forward from the vehicle lamp 10.

A light distribution pattern PA1 shown in FIG. 6A is a first light distribution pattern formed as a part of a high-beam light distribution pattern PH when the movable lens 20 is in the retracted position. A light distribution pattern PA2 shown in FIG. 6B is a second light distribution pattern formed as a part of the high-beam light distribution pattern PH when the movable lens 20 is in the light control position.

The high-beam light distribution pattern PH shown in FIG. 6A is formed as a combined light distribution pattern of a basic light distribution pattern PH0 formed by light irradiated from another vehicle lamp (not shown) and the light distribution pattern PA1.

The basic light distribution pattern PH0 is formed as a laterally elongated light distribution pattern widely spreading in the right and left direction around H-V (vanishing point in the front direction of the lamp).

On the other hand, the light distribution pattern PA1 is formed as a spot-like light distribution pattern which is slightly laterally elongated around the H-V, thereby forming a high luminous intensity area at the center of the high-beam light distribution pattern PH. The luminous intensity of the center portion of the light distribution pattern PA1 is considerably high, but the luminous intensity of the peripheral portion thereof is relatively low.

The high-beam light distribution pattern PH shown in FIG. 6B is formed as a combined light distribution pattern of the basic light distribution pattern PH0 and the light distribution pattern PA2.

The light distribution pattern PA2 is formed as a light distribution pattern obtained by displacing the light distribution pattern PA1 to the rightward direction. At that time, the rightward displacement amount of the light distribution pattern PA2 with respect to the light distribution pattern PA1 is about 2 to 4° (e.g., about 3°). That is, the maximum luminous intensity position of the light distribution pattern PA2 is changed to the rightward direction with respect to the light distribution pattern PA1.

When such a light distribution pattern PA2 is formed in the high-beam light distribution pattern PH, it is possible to enhance the distant visibility in the case where the travelling road in front of the vehicle is curved in the right side.

Next, an operational effect of the first embodiment will be described.

The vehicle lamp 10 according to the first embodiment is configured as a projector type vehicle lamp which is configured to form the light distribution pattern PA1 irradiating the front direction of the lamp as a required light distribution pattern. Further, as the movable lens 20 disposed between the projection lens 12 and the light source unit 14 is pivoted from the light control position to the retracted position, the light distribution pattern PA2 displaced to the rightward direction with respect to the light distribution pattern PA1 is formed (that is, the maximum luminous intensity position of the light distribution pattern is changed). Therefore, the following operational effects can be obtained.

That is, the maximum luminous intensity position of the light distribution patterns PA1, PA2 can be changed according to the movement position of the movable lens 20, and accordingly, the formation positions and light distribution of the light distribution patterns PA1, PA2 can be changed. Therefore, it is possible to perform a fine light distribution control according to a vehicle travelling situation.

In this manner, according to the present embodiment, it is possible to perform a fine light distribution control according to a vehicle travelling situation in the projector type vehicle lamp 10.

At that time, in the present embodiment, the light distribution pattern PA1 can be set as a light distribution pattern suitable for straight travelling, and the light distribution pattern PA2 can be set as a light distribution pattern suitable for rightward turning travelling.

Moreover, in the present embodiment, each of the light distribution patterns PA1, PA2 is formed as the spot-like light distribution pattern. Therefore, it is possible to perform a fine light distribution control according to a vehicle travelling situation while improving the distant visibility by each of the light distribution patterns PA1, PA2.

Further, the vehicle lamp 10 according to the present embodiment includes the reflector 16 for reflecting light emitted from the light source unit 14 toward the projection lens 12, and the reflector 16 is configured to reflect light emitted from the light source unit 14 toward the vicinity of the rear focus point F of the projection lens 12. Therefore, it is possible to easily form the spot-like light distribution pattern as each of the light distribution patterns PA1, PA2.

Meanwhile, in general, a pair of right and left vehicle lamps is attached to a vehicle. Therefore, for example, the light distribution pattern PA2 may be formed by the right vehicle lamp, whereas a light distribution pattern bilaterally symmetrical with the light distribution pattern PA2 with respect to the line V-V may be formed by the left vehicle lamp bilaterally symmetrical with the right vehicle lamp. Further, since the pair of right and left light distribution patterns can be selectively formed, it is possible to improve the distant visibility even when the travelling road in front of the vehicle is curved in either the left or right direction.

In the first embodiment, the deflection lens 28 is supported by the lens holder 22 via the metal holder 24. However, the deflection lens 28 may be directly supported by the lens holder 22 by adhesion or the like.

In the first embodiment, the movable lens 20 is configured to be able to adopt the light control position and the retracted position by the pivotal movement in the front and rear direction. However, the pivotal movement in the right and left direction may be adopted, or linear reciprocating movement in the upper and lower direction or in the right and left direction may be adopted, instead of the pivotal movement.

In the first embodiment, as the movable lens 20 moves from the retracted position to the light control position, the light distribution pattern PA2 displaced to the rightward direction with respect to the light distribution pattern PA1 is formed. However, by appropriately changing the curved surface shape of the front surface 28Aa of the lens body portion 28A, the light distribution pattern PA2 may be formed as a light distribution pattern obtained by changing the size and shape of the light distribution pattern PA1, instead of the light distribution pattern obtained by displacing the light distribution pattern PA1 to the rightward direction.

In the first embodiment, light emitted from the light source unit 14 is reflected by the reflector 16 and is incident on the projection lens 12. However, direct light from the light source unit 14 may be incident on the projection lens 12.

Next, modifications of the first embodiment will be described.

First, a first modification of the first embodiment will be described.

Figure 7:
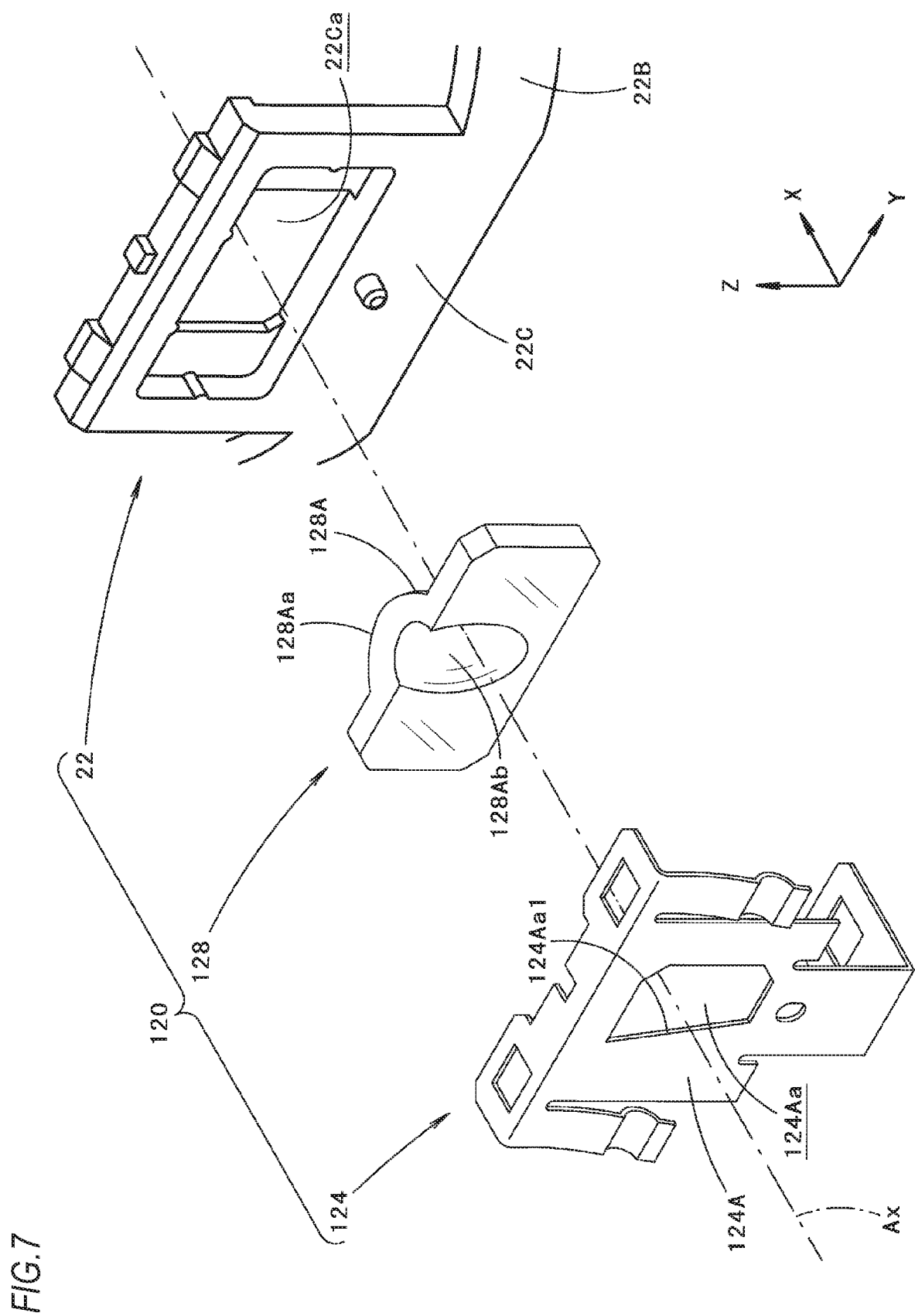
FIG. 7 is a view similar to FIG. 5, showing a main part of a vehicle lamp according to a first modification of the first embodiment.

FIG. 7 is a view similar to FIG. 5, showing a main part of a vehicle lamp according to the present modification.

As shown in FIG. 7, a basic configuration of the present modification is similar to that of the first embodiment, but the configurations of a metal holder 124 and a deflection lens 128 of a movable lens 120 are different from those of the first embodiment.

A basic configuration of the metal holder 124 of the present modification is also similar to that of the metal holder 24 of the first embodiment, but the shape of an opening portion 124Aa formed in a vertical surface portion 124A thereof is different from that of the first embodiment.

That is, in the metal holder 24 of the first embodiment, the opening portion 24Aa has a shape close to a square. On the contrary, the shape of the opening portion 124Aa in the metal holder 124 of the present modification is formed in a substantially trapezoidal shape in which approximately the left half region of the opening portion 124Aa of the metal holder 124 is closed. At that time, a side end surface 124Aa1 located on the left side of the opening portion 124Aa in the vertical surface portion 124A is formed to be inclined slightly to the left side with respect to the vertical direction.

Further, a basic configuration of the deflection lens 128 of the present modification is similar to that of the deflection lens 28 of the first embodiment, but the horizontal cross-sectional shape of a lens body portion 128A thereof is different from that of the first embodiment.

That is, the lens body portion 128A of the present modification also has a front surface 128Aa formed in a convex curved surface shape and a rear surface 128Ab formed in a concave curved surface shape. At that time, the rear surface 128Ab is configured by a curved surface substantially along a longitudinally elongated elliptical surface centered on a point positioned slightly above the optical axis Ax, and the front surface 128Aa is configured by a curved surface in which a region on the left side of the optical axis Ax largely bulges forward.

In this manner, the lens body portion 128A of the present modification is formed so that its thickness gradually increases from a right end edge to a left end edge, contrary to the lens body portion 28A of the first embodiment. However, the uneven degree of the thickness is smaller in the lens body portion 128A of the present modification than in the lens body portion 28A of the first embodiment.

Further, in the present modification, when the movable lens 120 is in the light control position, a part of light reflected from the reflector 16 is shield by the metal holder 124, and only the light passing through the opening portion 124Aa is deflected to the left side by about 1 to 3° (e.g., about 2°) by the deflection lens 128, and then, reaches the projection lens 12.

That is, the metal holder 124 is adapted to function as a shade for shielding a part of light emitted from the light source unit 14 and directed to the movable lens 120.

Figure 8A:
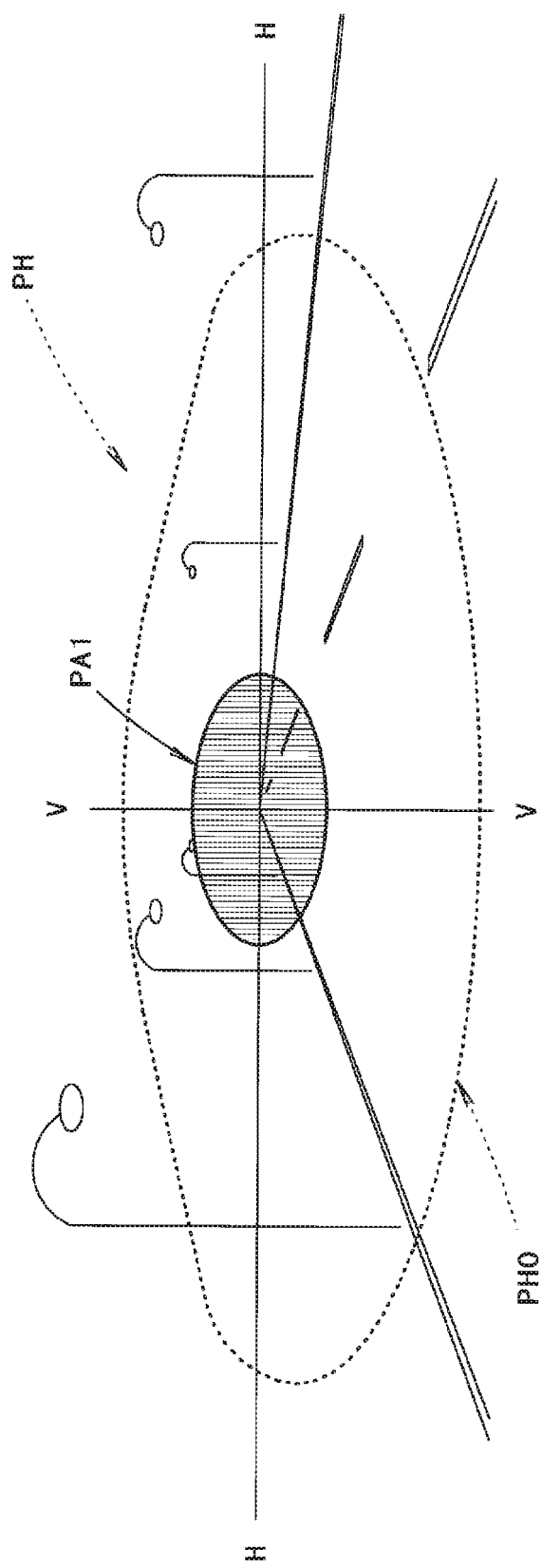
FIG. 8A is a view similar to FIG. 6A, showing an operation of the first modification.
Figure 8B:
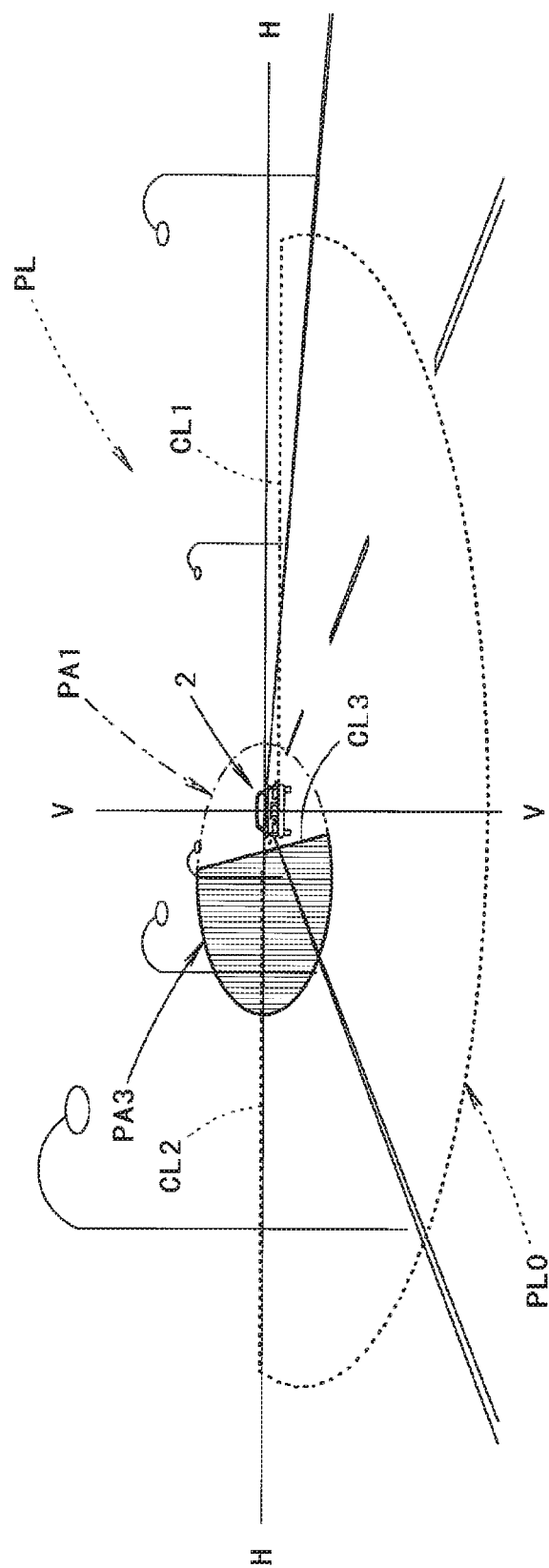
FIG. 8B is a view similar to FIG. 6B, showing an operation of the first modification.

FIG. 8B is a view perspectively showing a light distribution pattern PA3 formed when the movable lens 120 is in the light control position, in the present modification.

Meanwhile, FIG. 8A is a view similar to FIG. 6A (that is, a view showing the light distribution pattern PA1 formed when the movable lens 120 is in the retracted position).

As shown in FIG. 8B, the light distribution pattern PA3 is formed as a part of a low-beam light distribution pattern PL.

That is, the low-beam light distribution pattern PL is formed as a combined light distribution pattern of a basic light distribution pattern PLO formed by light irradiated from another vehicle lamp (not shown) and the light distribution pattern PA3.

The basic light distribution pattern PLO is a low-beam light distribution pattern of left light distribution. The basic light distribution pattern PLO is formed as a laterally elongated light distribution pattern widely spreading in the right and left direction around H-V and has right and left stepped cutoff lines CL1, CL2 on the upper end edge thereof. The cutoff lines CL1, CL2 horizontally extend to have a right and left step with the line V-V passing through H-V in the vertical direction as a boundary. The oncoming vehicle lane side portion on the right side of the line V-V is formed as the lower stage cutoff line CL1, and the own lane side portion on the left side of the line V-V is formed as the upper stage cutoff line CL2 which is stepped upward from the lower stage cutoff line CL1 via an inclination portion.

On the other hand, the light distribution pattern PA3 is formed as a light distribution pattern in which the right region of the light distribution pattern PA1 is cut away by nearly half in a state of being displaced to the leftward direction by about 1 to 3° (e.g., about 2°) with respect to the light distribution pattern PA1. That is, the maximum luminous intensity position of the light distribution pattern PA3 is changed to the leftward direction with respect to the light distribution pattern PA1.

In the light distribution pattern PA3, a cutoff line CL3 extending to be inclined slightly to the left side with respect to the vertical direction is formed at the position of about 1 to 2° (e.g., about 1.5°) on the left side of the line V-V.

When such a light distribution pattern PA3 is formed in the low-beam light distribution pattern PL, it is possible to brightly irradiate the road surface and road shoulder and the like in front of the vehicle on the own lane side without giving a glare to a driver of a preceding vehicle 2.

Also in the case of adopting the configuration of the present modification, it is possible to perform a fine light distribution control according to a vehicle travelling situation.

Meanwhile, in general, a pair of right and left vehicle lamps is attached to a vehicle. Therefore, for example, the light distribution pattern PA3 may be formed by the left vehicle lamp, whereas a light distribution pattern bilaterally symmetrical with the light distribution pattern PA3 with respect to the line V-V may be formed by the right vehicle lamp bilaterally symmetrical with the left vehicle lamp. Further, since the pair of right and left light distribution patterns can be selectively formed, it is possible to improve the visibility in front of a vehicle without giving a glare to a driver of a preceding vehicle 2 and a driver of an oncoming vehicle.

Next, a second modification of the first embodiment will be described.

Figure 9:
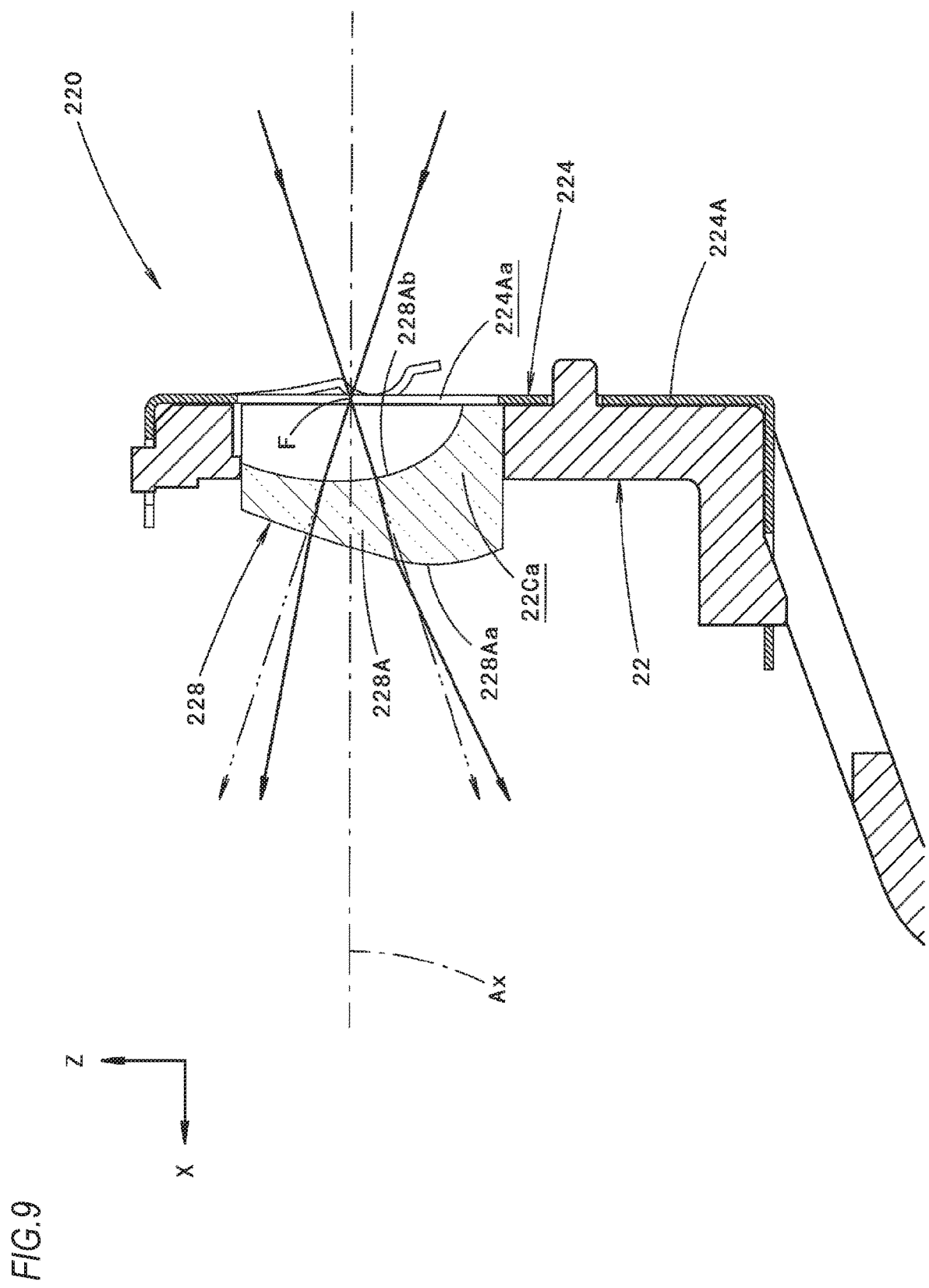
FIG. 9 is a view similar to FIG. 3, showing a main part of a vehicle lamp according to a second modification of the first embodiment.
Figure 10:
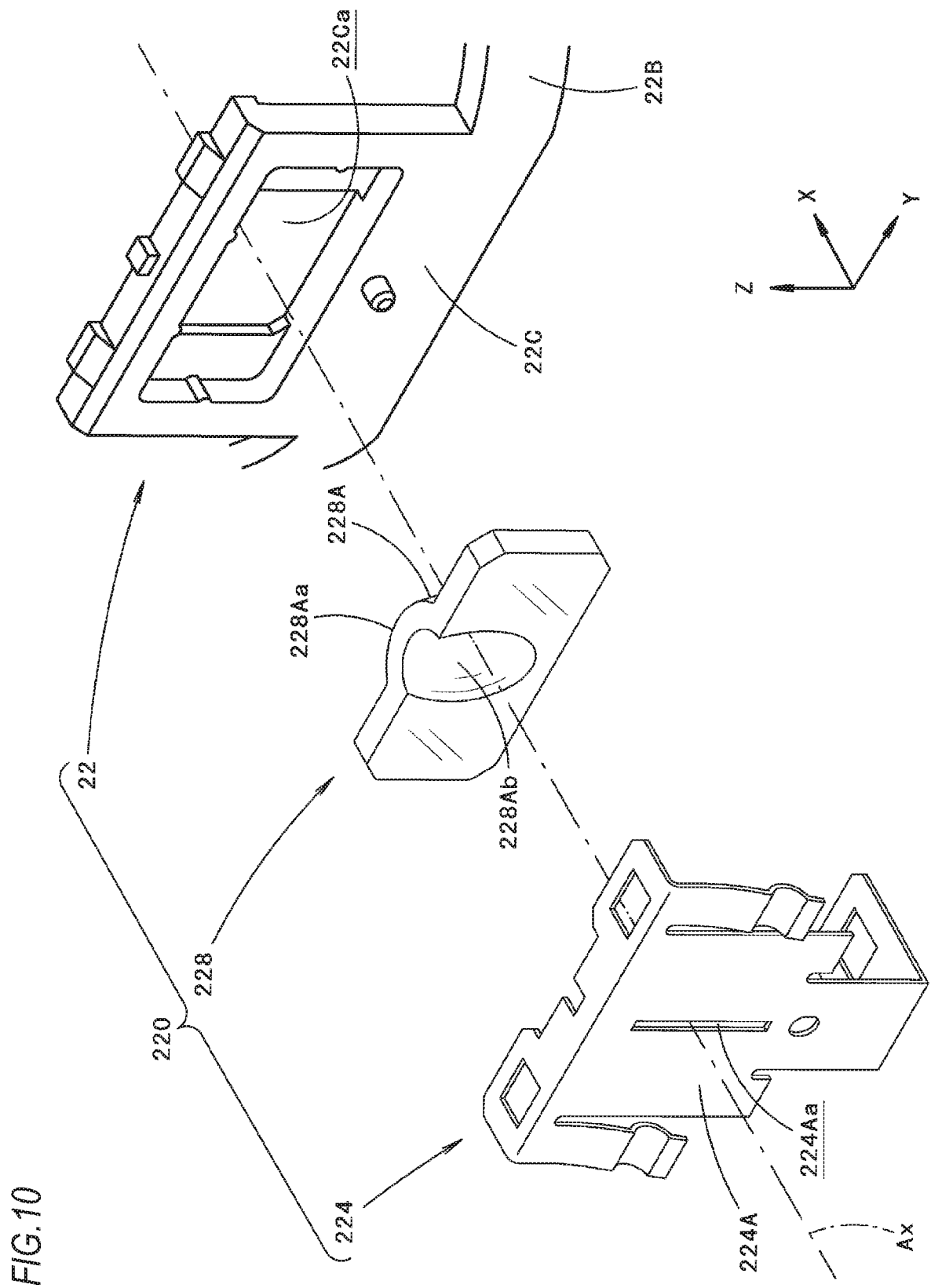
FIG. 10 is a view similar to FIG. 5, showing a main part of the vehicle lamp according to the second modification.

FIGS. 9 and 10 are views similar to FIGS. 3 and 5, showing a main part of a vehicle lamp according to the present modification. Further, as shown in FIGS. 9 and 10, a basic configuration of the present modification is similar to that of the first embodiment, but the configurations of a metal holder 224 and a deflection lens 228 of a movable lens 220 are different from those of the first embodiment.

A basic configuration of the metal holder 224 of the present modification is also similar to that of the metal holder 24 of the first embodiment, but the present modification is different from the first embodiment in that, instead of the opening portion 24Aa of the first embodiment, a slit 224Aa is formed in a vertical surface portion 224A of the metal holder 224.

The slit 224Aa is formed to extend in the upper and lower direction at the center portion of the vertical surface portion 224A in the right and left direction and has a rectangular opening shape which is longitudinally elongated.

The slit 224Aa is formed to have substantially the same height as the vertical width of the deflection lens 228 and is slightly longer in the lower side region than in the upper side region with respect to the optical axis Ax. The lateral width of the slit 224Aa is set to about 1 to 3 mm (e.g., about 2 mm).

Further, a basic configuration of the deflection lens 228 of the present modification is similar to that of the deflection lens 28 of the first embodiment, but the shape of a lens body portion 228A thereof is different from that of the first embodiment.

That is, the lens body portion 228A of the present modification also has a front surface 228Aa formed in a convex curved surface shape and a rear surface 228Ab formed in a concave curved surface shape. At that time, the rear surface 228Ab is configured by a curved surface substantially along a longitudinally elongated elliptical surface centered on a point positioned slightly above the optical axis Ax, and the front surface 228Aa is configured by a curved surface in which a region on the lower side of the optical axis Ax bulges forward.

However, the lens body portion 228A is formed so that its thickness is constant in the horizontal cross-section but its thickness gradually increases from an upper end edge to a lower end edge in the vertical cross-section.

In this manner, the deflection lens 228 deflects light reflected from the reflector 16 to the lower side by a certain angle. The downward deflection amount at that time is set to about 1 to 3° (e.g., about 2°).

In the present modification, when the movable lens 220 is in the light control position, most of light reflected from the reflector 16 is shielded by the metal holder 224, and only the light passing through the slit 224Aa is deflected downward by the deflection lens 28, and then, reaches the projection lens 12.

That is, the metal holder 224 functions as a shade for shielding a part of light emitted from the light source unit 14 and directed toward the movable lens 220.

Figure 11A:
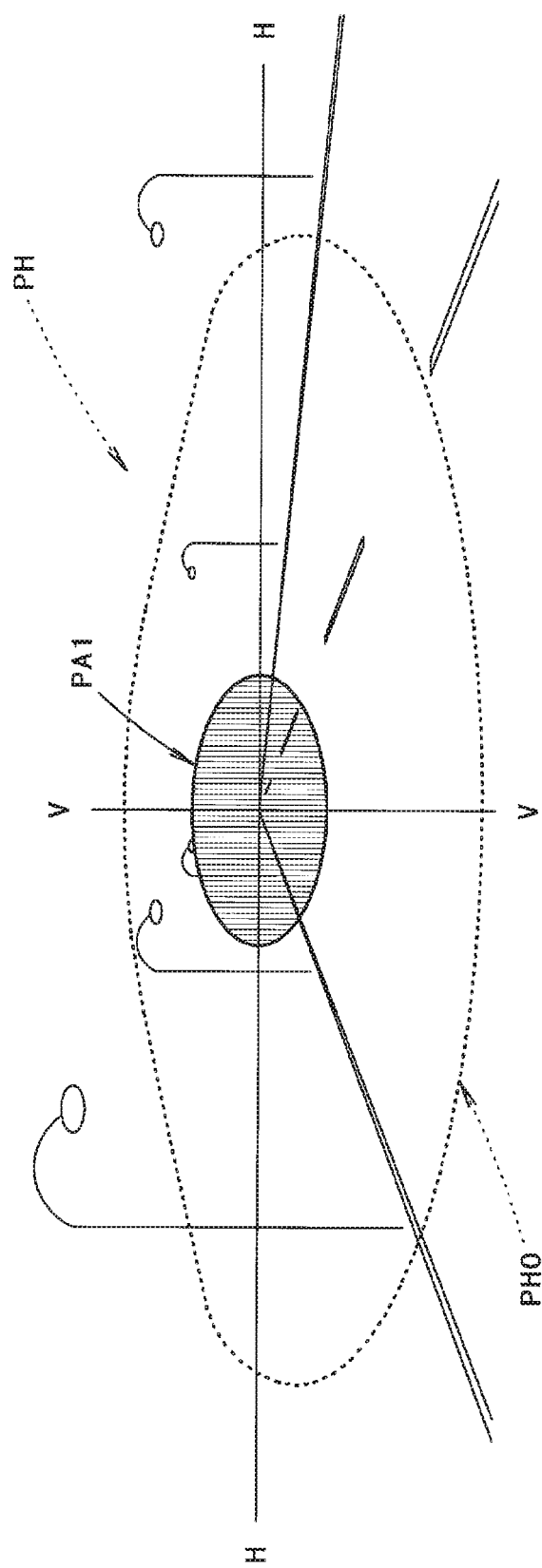
FIG. 11A is a view similar to FIG. 6A, showing an operation of the second modification.
Figure 11B:
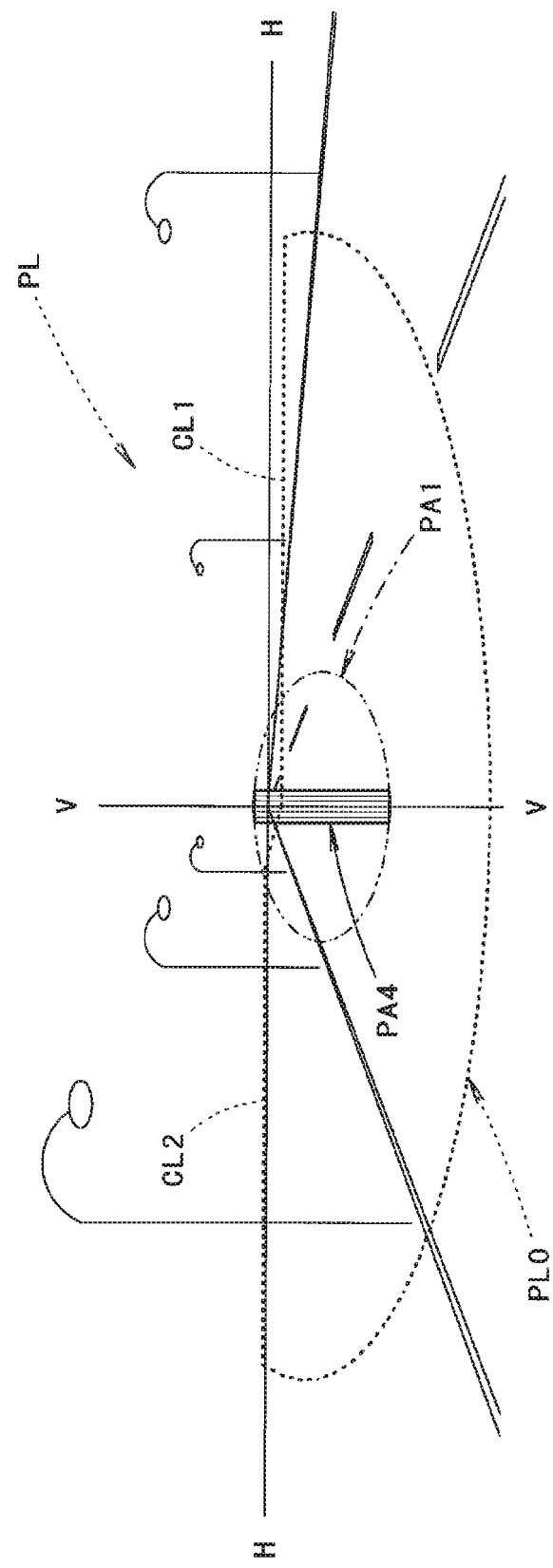
FIG. 11B is a view similar to FIG. 6B, showing an operation of the second modification.

FIG. 11B is a view perspectively showing a light distribution pattern PA4 formed when the movable lens 220 is in the light control position, in the present modification.

Meanwhile, FIG. 11A is a view similar to FIG. 6A (that is, a view showing the light distribution pattern PA1 formed when the movable lens 220 is in the retracted position).

As shown in FIG. 11B, the light distribution pattern PA4 is formed as a part of the low-beam light distribution pattern PL.

The low-beam light distribution pattern PL is formed as a combined light distribution pattern of the basic light distribution pattern PL0 and the light distribution pattern PA4.

The second light distribution pattern PA2 is formed as a light distribution pattern obtained by cutting both right and left side portions of the light distribution pattern PA1 to form a longitudinally elongated band-like light distribution pattern and then displacing this light distribution pattern downward. At that time, the downward displacement amount of the light distribution pattern PA2 with respect to the light distribution pattern PA1 is about 1 to 3° (e.g., about 2°), and the lateral width of the light distribution pattern PA2 is about 1 to 3° (e.g., about) 2°. That is, the maximum luminous intensity position of the light distribution pattern PA4 is changed downward with respect to the light distribution pattern PA1.

When such a light distribution pattern PA2 is formed in the low-beam light distribution pattern PL, a band of light linearly extending forward can be generated as a road surface drawing (that is, as a pattern of light intentionally formed on the road surface) on the road surface in front of the vehicle, thereby enhancing the calling attention function to the surroundings.

The light distribution pattern PA4 is formed such that its upper end portion extends beyond the cutoff lines CL1, CL2 to a position slightly above the H-V. However, since the luminous intensity of the peripheral edge portion of the light distribution pattern PA1 is relatively low as described above and the luminous intensity of both upper and lower end portions of the light distribution pattern PA4 is also relatively low, a harmful glare will not be given to a driver of a preceding vehicle or the like.

Also in the case of adopting the configuration of the present modification, it is possible to perform a fine light distribution control according to a vehicle travelling situation.

Hereinafter, a second embodiment will be described.

Figure 13:
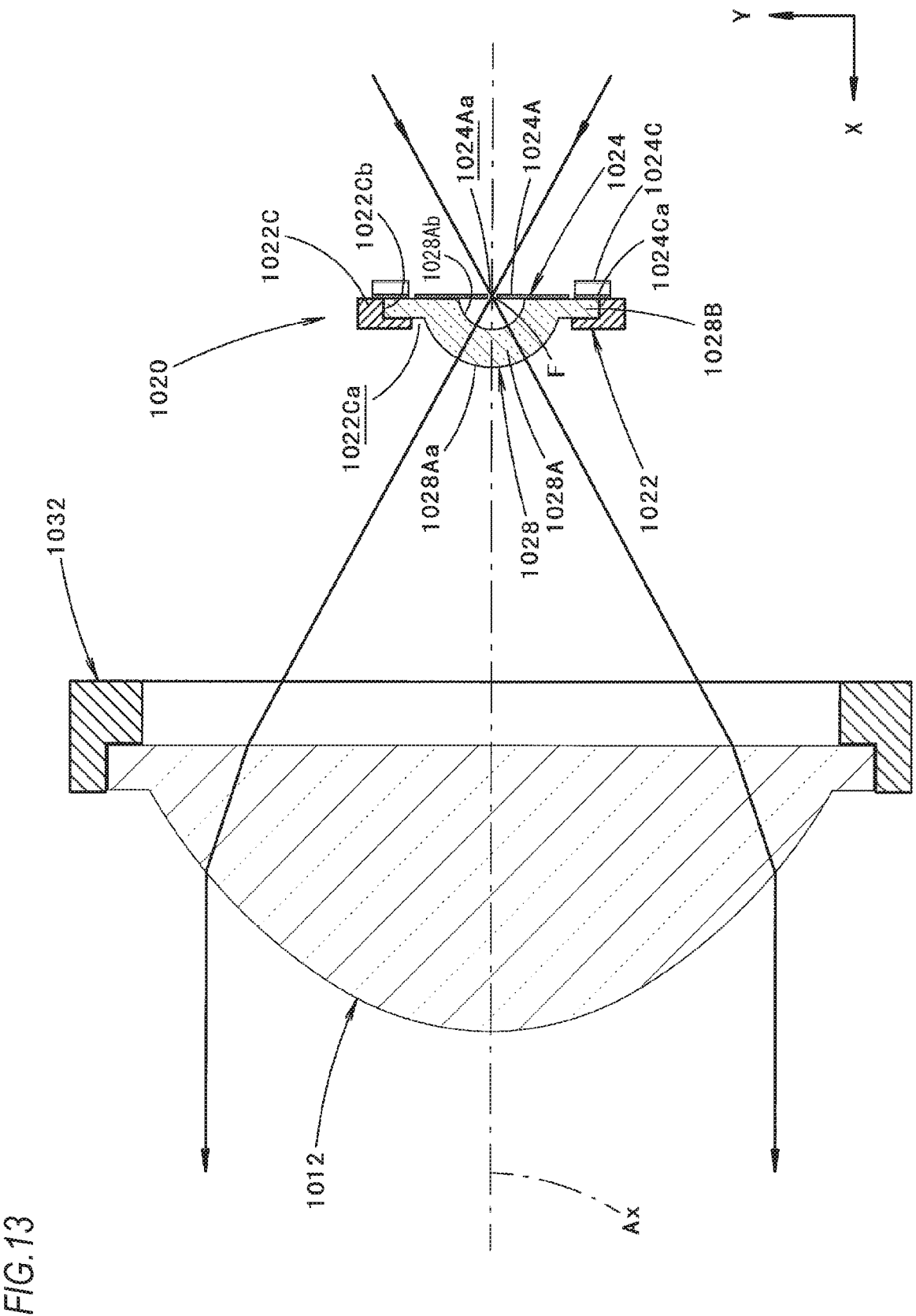
FIG. 13 is a sectional view taken along the line II-II in FIG. 12.

FIG. 12 is a side sectional view showing a vehicle lamp 1010 according to a second embodiment of the disclosure, and FIG. 13 is a sectional view taken along the line II-II in FIG. 12. Meanwhile, in FIGS. 12 and 13, the direction indicated by X is the "front" of the lamp (also the "front" of the vehicle), the direction indicated by Y is the "right direction," and the direction indicated by Z is the "upper direction." The same is applied to other figures.

As shown in FIGS. 12 and 13, the vehicle lamp 1010 according to the present embodiment is a projector type lamp unit used in a state of being incorporated as a part of a headlamp. The vehicle lamp 1010 includes a projection lens 1012, a light source unit 1014 disposed on the rear side of a rear focus point F of the projection lens 1012, a reflector 1016 configured to reflect light emitted from the light source unit 1014 toward the projection lens 1012, and a movable shade 1020 disposed between the light source unit 1014 and the projection lens 1012.

The projection lens 1012 is a plano-convex aspheric lens having a front convex surface and a rear flat surface. The projection lens 1012 is configured to project a light source image formed on a rear focal plane that is a focal plane including the rear focus point F thereof, as an inverted image, on a virtual vertical screen in front of the lamp. The projection lens 1012 is supported by a lens holder 1032 at its outer peripheral flange portion. The lens holder 1032 is supported by a base member 1034 via a pair of right and left brackets 1036.

The light source unit 1014 is configured so that light emitted from a laser diode 1014a as a light source is focused on a light emitting portion 1014c made of a phosphor by a condenser lens 1014b and is emitted as white diffused light from the light emitting portion 1014c. The emission light from the light source unit 1014 is set such that the emitted light from the center position of the light emitting portion 1014c has the highest luminous intensity. The light emitting portion 1014c of the light source unit 1014 has a circular surface shape. The light source unit 1014 is supported on the base member 1034 in a state where the surface thereof is oriented in a direction inclined rearward with respect to the vertical upper side.

The reflector 1016 is supported by a pair of right and left brackets 1036 in a state of being disposed so as to cover the light source unit 1014 from the upper side. A reflecting surface 1016a of the reflector 1016 is configured by a spheroidal surface in which the light emission center of the light emitting portion 1014c of the light source unit 1014 is a first focus and the rear focus point F of the projection lens 1012 is a second focus. In this way, the reflector 1016 condenses light emitted from the light source unit 1014 in the vicinity of the rear focus point F of the projection lens 1012.

The movable shade 1020 includes a shade holder 1022 pivotably supported by an actuator (e.g., solenoid, etc.) 1030 via a pivot pin 1026, and a shade body 1024 supported by the shade holder 1022. The pivot pin 1026 is disposed to extend in a right and left direction below the optical axis Ax and in front of the rear focus point F, and both ends of thereof are supported by the actuator 1030 and a support bracket (not shown). The actuator 1030 and the support bracket are supported on the base member 1034.

The movable shade 1020 can adopt a light-shielding position (position indicated by a solid line in FIG. 12) and a light-shielding release position (position indicated by a two-dot chain line in FIG. 12) pivoted rearward by a predetermined angle from the light-shielding position by the driving of the actuator 1030. The actuator 1030 is driven when an operation of a beam selector switch (not shown) is performed.

A deflection lens 1028 for changing the direction of light reflected from the reflector 1016 is attached to the movable shade 1020. The deflection lens 1028 is fixed to the shade holder 1022 by the shade body 1024.

Figure 14:
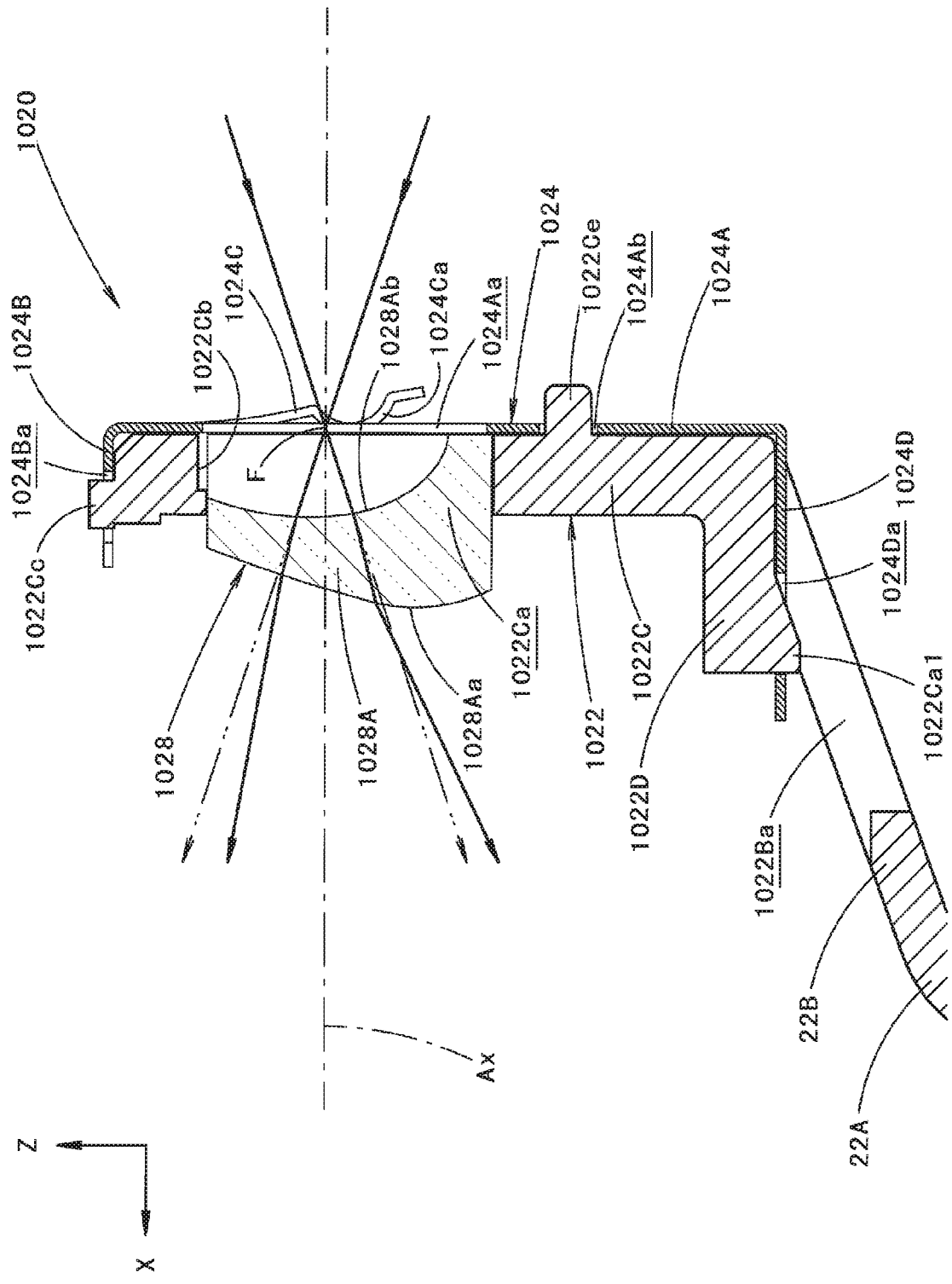
FIG. 14 is a detailed view of a main part of FIG. 12, showing main components of the vehicle lamp according to the second embodiment.

FIG. 14 is a detailed view of a main part of FIG. 12, showing main components of the vehicle lamp 1010.

Figure 15:
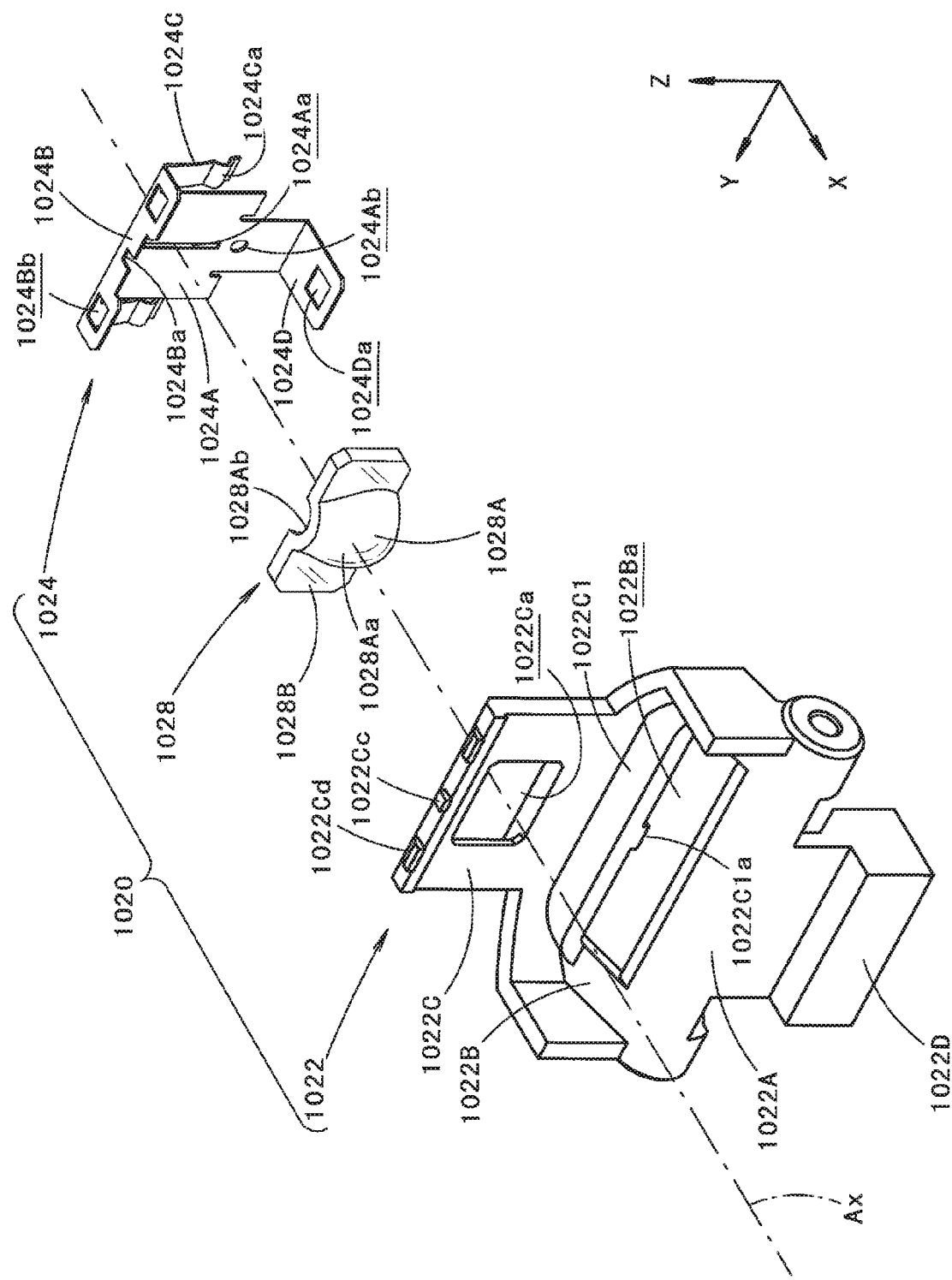
FIG. 15 is a perspective view showing the main components in a disassembled state, as seen diagonally from the upper front side.
Figure 16:
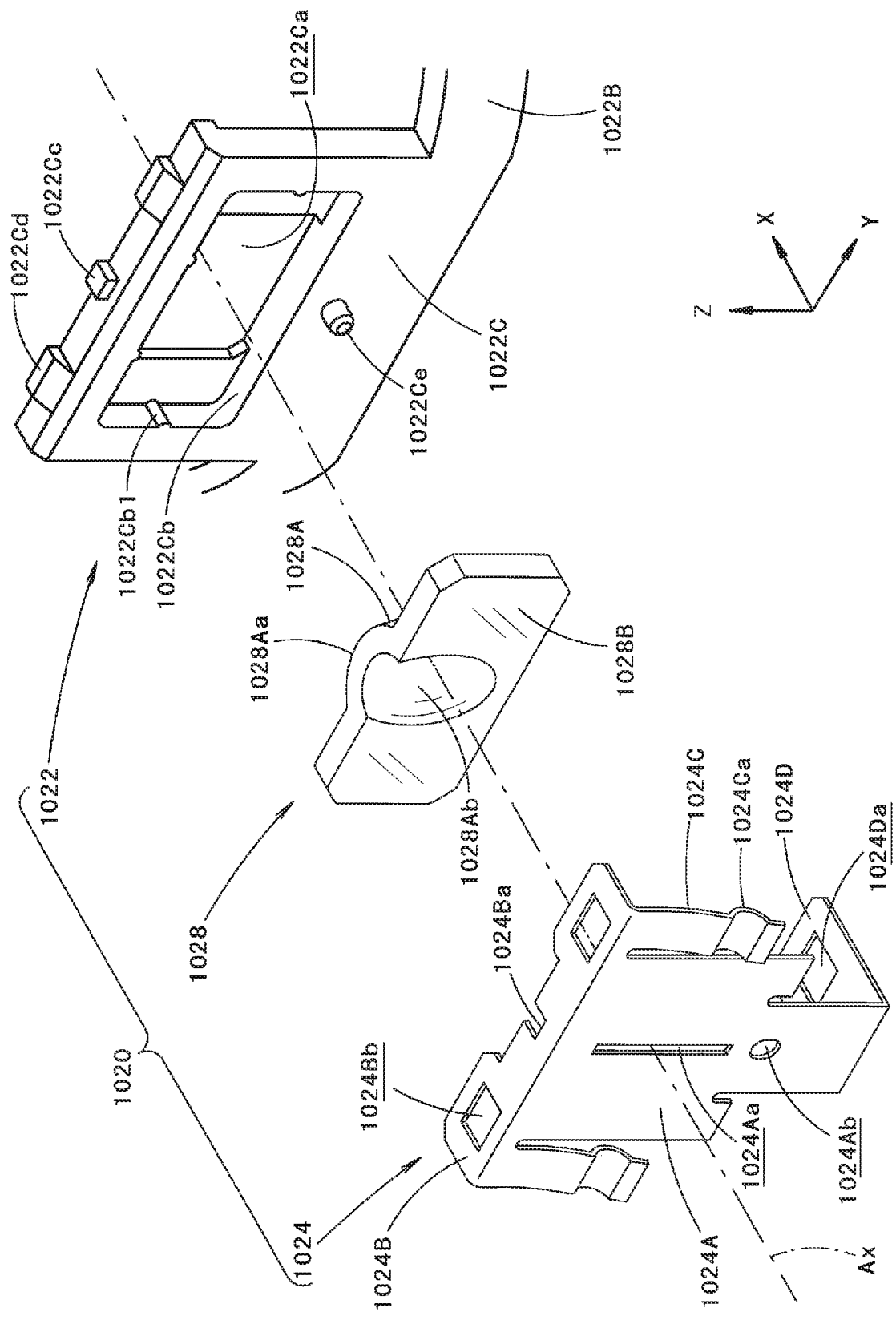
FIG. 16 is a perspective view showing the main components in a disassembled state, as seen diagonally from the upper rear side.

Further, FIGS. 15 and 16 are perspective views showing a state in which the main components of the vehicle lamp 1010 are disassembled into respective elements. FIG. 15 is a perspective view showing the shade holder 1022, the shade body 1024 and the deflection lens 1028 constituting the movable shade 1020 as seen diagonally from the upper front side, and FIG. 16 is a perspective view showing these elements as seen diagonally from the upper rear side.

As shown in FIGS. 14 to 16, the shade holder 1022 is a die-cast molded product and has a pivot pin supporting portion 1022A for supporting the pivot pin 1026, an inclination portion 1022B extending obliquely upward and rearward from the pivot pin supporting portion 1022A, an upright wall portion 1022C extending vertically upward from a rear end edge of the inclination portion 1022B, and a counterweight portion 1022D extending downward from the pivot pin supporting portion 1022A. The inclination portion 1022B is extended to both right and left sides and curved forward from the position below the optical axis Ax, in a plan view. Further, the upright wall portion 1022C and the counterweight portion 1022D are formed to have a lateral width narrower than the pivot pin supporting portion 1022A and the inclination portion 1022B.

An opening portion 1022Ba penetrating the inclination portion 1022B in the front and rear direction is formed in the inclination portion 1022B. Further, an opening portion 1022Ca penetrating the upright wall portion 1022C in the front and rear direction is also formed in the upright wall portion 1022C. The opening portion 1022Ba has a substantially rectangular opening shape which is laterally elongated. On the other hand, the opening portion 1022Ca has a substantially rectangular opening shape slightly laterally elongated and is formed to surround the optical axis Ax.

A horizontal portion 1022C1 extending forward along a horizontal plane is formed at a lower end portion of the upright wall portion 1022C. A protrusion 1022C1a protruding downward so as to face the opening portion 1022Ba is formed at the center portion in the right and left direction on the lower surface of the horizontal portion 1022C1.

A rectangular concave portion 1022Cb spreading from the opening portion 1022Ca toward the right and left sides is formed on the rear surface of the upright wall portion 1022C. Beads 1022Cb1 extending in the front and rear direction are formed on the right and left wall surfaces and upper surface of the rectangular concave portion 1022Cb.

An upper end surface of the upright wall portion 1022C extends along the horizontal plane. A protrusion 1022Cc is formed at the central portion of the upper end surface in the right and left direction, and protrusions 1022Cd are formed at portions near both ends thereof in the right and left direction.

A columnar pin 1022Ce protruding rearward is formed at a portion in the vicinity below the opening portion 1022Ca in the center portion of the rear surface of the upright wall portion 1022C in the right and left direction.

The shade body 1024 is a member formed by processing a metal plate having a spring property and has a bilaterally-symmetrical shape with respect to the optical axis Ax.

The shade body 1024 has a vertical surface portion 1024A extending along the vertical plane orthogonal to the optical axis Ax, an upper surface portion 1024B extending forward from an upper end edge of the vertical surface portion 1024A, leaf spring portions 1024C extending downward from a rear end edge of the upper surface portion 1024B on both right and left sides of the vertical surface portion 1024A, and a lower surface portion 1024D extending forward from a lower end edge of the vertical surface portion 1024A.

The vertical surface portion 1024A is formed to have substantially the same vertical width as the upright wall portion 1022C of the shade holder 1022 and formed to have substantially the same lateral width as the opening portion 1022Ca of the upright wall portion 1022C.

A longitudinally elongated rectangular slit 1024Aa extending in the upper and lower direction is formed at the center portion of the vertical surface portion 1024A in the right and left direction. The slit 1024Aa is formed to have substantially the same height as the vertical width of the deflection lens 1028 and is slightly longer in the lower side region than in the upper side region with respect to the optical axis Ax. Further, the lateral width of the slit 1024Aa is set to about 1 to 3 mm (e.g., about 2 mm).

An elongated hole 1024Ab slightly longer in the upper and lower direction is formed in the vicinity below the slit 1024Aa of the vertical surface portion 1024A.

The upper surface portion 1024B extends along the horizontal plane. A rectangular notch portion 1024Ba is formed at the center portion of the upper surface portion in the right and left direction, and rectangular opening portions 1024Bb are formed at portions near both ends thereof in the right and left direction.

Each leaf spring portion 1024C is extended downward and curved rearward. A semi-cylindrical portion 1024Ca, which has a semi-cylindrical shape extending in the right and left direction and protrudes forward, is formed at a portion in the vicinity of a lower end of each leaf spring portion 24C.

The lower surface portion 1024D extends along the horizontal plane, and a rectangular opening portion 1024Da is formed at a portion in the vicinity of a front end thereof.

The deflection lens 1028 is a lens made of resin, and has a lens body portion 1028A and a pair of flange portions 1028B extending to both right and left sides from the lens body portion 1028A. The deflection lens 1028 has a bilaterally-symmetrical shape with respect to the optical axis Ax.

The pair of right and left flange portions 1028B is formed to extend in a flat plate along the vertical plane orthogonal to the optical axis Ax. The lens body portion 1028A is formed to protrude forward from both flange portions 1028B.

The lens body portion 1028A has a front surface 1028Aa formed in a convex curved surface shape and a rear surface 1028Ab formed in a concave curved surface shape. The rear surface 1028Ab is configured by a curved surface substantially along a longitudinally elongated elliptical surface centered on a point positioned slightly above the optical axis Ax. The front surface 1028Aa is configured by a curved surface in which a region on the lower side of the optical axis Ax largely bulges forward.

That is, the lens body portion 1028A is formed so that its thickness is constant in the horizontal cross-section but its thickness gradually increases from an upper end edge to a lower end edge in the vertical cross-section.

In this manner, the deflection lens 1028 is adapted to deflect light reflected from the reflector 1016 to the lower side by a certain angle. The downward deflection amount at that time is set to about 1 to 3° (e.g., about 2°).

The shade body 1024 and the deflection lens 1028 are attached to the upright wall portion 1022C of the shade holder 1022. This attachment is carried out as follows.

That is, first, the deflection lens 1028 is inserted into the opening portion 1022Ca of the upright wall portion 1022C of the shade holder 1022 from the rear side, and both flange portions 1028B are abutted against the rectangular concave portion 1022Cb. In this manner, the lens body portion 1028A protrudes forward from the opening portion 1022Ca of the upright wall portion 1022C.

Subsequently, the notch portion 1024Ba formed in the upper surface portion 1024B of the shade body 1024 is engaged with the protrusion 1022Cc formed in the upper end surface of the upright wall portion 1022C to perform the positioning in the right and direction, and the pair of right and left opening portions 1024Bb formed in the upper surface portion 1024B is engaged with the pair of right and left protrusions 1022Cd formed in the upper end surface of the upright wall portion 1022C.

Subsequently, the semi-cylindrical portions 1024Ca of the pair of right and left leaf spring portion 1024C are pressed against the flange portions 1028B of the deflection lens 1028, thereby elastically deforming each of the leaf spring portions 1024C.

Then, the opening portion 1024Da formed in the lower surface portion 1024D of the shade body 1024 is engaged with the protrusion 1022C1a formed in the lower surface of the horizontal portion 1022C1 of the upright wall portion 1022C to fix the shade body 1024 to the shade holder 1022. In this way, the deflection lens 1028 is positioned by being clamped by the shade body 1024 and the shade holder 1022 from both front and rear sides.

When the movable shade 1020 is in the light-shielding position, the vertical surface portion 1024A of the shade body 1024 thereof is arranged to extend along the vertical plane orthogonal to the optical axis Ax and, at this time, the center position of the slit 1024Aa is positioned slightly below the rear focus point F of the projection lens 1012.

Further, when the movable shade 1020 is in the light-shielding position, most of light reflected from the reflector 1016 is shielded by the shade body 1024, and only the light passing through the slit 1024Aa is deflected downward by the deflection lens 1028 and then reaches the projection lens 1012. On the other hand, when the movable shade 1020 is in the light-shielding release position, light reflected from the reflector 1016 is not shielded by the shade body 1024 and reaches the projection lens 1012.

Figure 17B:
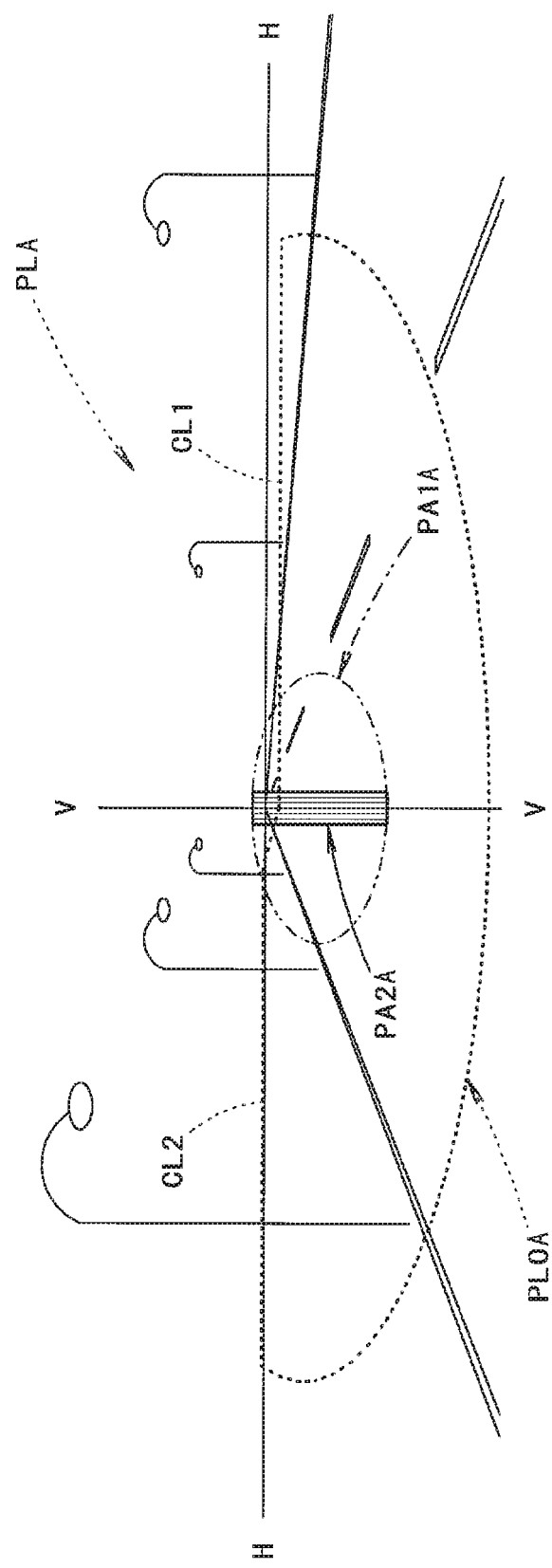
FIG. 17B is a view showing a light distribution pattern formed by irradiation light from the vehicle lamp and showing a second light distribution pattern.

FIGS. 17A and 17B are views perspectively showing a light distribution pattern formed on a virtual vertical screen disposed at a position of 25 m in front of the lamp by light irradiated forward from the vehicle lamp 1010.

A light distribution pattern PA1A shown in FIG. 17A is a first light distribution pattern formed as a part of a high-beam light distribution pattern PHA when the movable shade 1020 is in the light-shielding release position, and a light distribution pattern PA2A shown in FIG. 17B is a second light distribution pattern formed as a part of a low-beam light distribution pattern PLA when the movable shade 1020 is in the light-shielding position.

The high-beam light distribution pattern PHA shown in FIG. 17A is formed as a combined light distribution pattern of a basic light distribution pattern PH0A formed by light irradiated from another vehicle lamp (not shown) and the first light distribution pattern PA1A.

The basic light distribution pattern PH0A is formed as a laterally elongated light distribution pattern widely spreading in the right and left direction around H-V (vanishing point in the front direction of the lamp).

On the other hand, the first light distribution pattern PA1A is formed as a spot-like light distribution pattern which is slightly laterally elongated around the H-V, thereby forming a high luminous intensity area at the center of the high-beam light distribution pattern PHA. The luminous intensity of the center portion of the first light distribution pattern PA1A is considerably high, but the luminous intensity of the peripheral portion thereof is relatively low.

The low-beam light distribution pattern PLA shown in FIG. 17B is formed as a combined light distribution pattern of the basic light distribution pattern PL0A formed by light irradiated from another vehicle lamp (not shown) and the second light distribution pattern PA2A.

The basic light distribution pattern PL0A is a low-beam light distribution pattern of left light distribution. The basic light distribution pattern PL0A is formed as a laterally elongated light distribution pattern widely spreading in the right and left direction around H-V and has right and left stepped cutoff lines CL1, CL2 on the upper end edge thereof. The cutoff lines CL1, CL2 horizontally extend to have a right and left step with the line V-V passing through the H-V in the vertical direction as a boundary. The oncoming vehicle lane side portion on the right side of the line V-V is formed as the lower stage cutoff line CL1, and the own lane side portion on the left side of the line V-V is formed as the upper stage cutoff line CL2 which is stepped upward from the lower stage cutoff line CL1 via an inclination portion.

On the other hand, the second light distribution pattern PA2A is formed as a light distribution pattern obtained by cutting both right and left side portions of the first light distribution pattern PA1A to form a longitudinally elongated band-like light distribution pattern and then displacing this light distribution pattern downward. At that time, the downward displacement amount of the second light distribution pattern PA2A with respect to the first light distribution pattern PA1A is about 1 to 3° (e.g., about 2°), and the lateral width of the second light distribution pattern PA2 is about 1 to 3° (e.g., about 2°).

When such a second light distribution pattern PA2A is formed in the low-beam light distribution pattern PLA, a band of light linearly extending forward can be generated as a road surface drawing on the road surface in front of the vehicle, thereby enhancing the calling attention function to the surroundings.

The second light distribution pattern PA2A is formed such that its upper end portion extends beyond the cutoff lines CL1, CL2 to a position slightly above the H-V. However, since the luminous intensity of the peripheral edge portion of the first light distribution pattern PA1A is relatively low as described above and the luminous intensity of both upper and lower end portions of the second light distribution pattern PA2A is also relatively low, a harmful glare will not be given to a driver of a preceding vehicle or the like.

Next, an operational effect of the second embodiment will be described.

The vehicle lamp 1010 according to the present embodiment is a projector type lamp unit and configured to form the first light distribution pattern PA1A. However, the second light distribution pattern PA2A having a lateral width smaller than that of the first light distribution pattern PA1A can be formed by the light-shielding action of the movable shade 1020 serving as a first light control unit disposed between the projection lens 1012 and the light source unit 1014. Further, when the light-shielding is performed, the formation position of the second light distribution pattern PA2A can be displaced downward by the deflection lens 1028 serving as a second light control unit. Therefore, the following operational effects can be obtained.

That is, since the second light distribution pattern PA2A having a lateral width smaller than that of the first light distribution pattern PA1A is formed by the light-shielding action of the movable shade 1020 and the formation position thereof is displaced downward by the deflection lens 1028, it is possible to efficiently perform the light irradiation on the road surface in front of the vehicle, as compared with the light distribution pattern in which only a part of the first light distribution pattern PA1A is cut off.

In this manner, according to the projector type vehicle lamp 1010 of the present embodiment, the light distribution patterns PA1A, PA2A having different shapes can be formed, and the light irradiation on the road surface in front of the vehicle can be efficiently performed.

Further, since the formation position of the second light distribution pattern PA2A is displaced downward as described above, it is possible to easily perform the road surface drawing by the light irradiation on the road surface in front of the vehicle. Further, it is possible to reduce the possibility of giving a glare to a driver of a preceding vehicle, a driver of an oncoming vehicle, or a crossing pedestrian or the like.

Moreover, in the present embodiment, a spot-like light distribution pattern is formed as the first light distribution pattern PA1A. Therefore, the distant visibility can be improved by the first light distribution pattern PA1A, and the road surface in front of the vehicle can be locally brightly irradiated by the second light distribution pattern PA2A.

In the present embodiment, a longitudinally elongated band-like light distribution pattern in which both right and left side portions of the first light distribution pattern PA1A are cut off is formed as the second light distribution pattern PA2A. Therefore, a band of light linearly extending forward can be formed as the road surface drawing on the road surface in front of the vehicle by the second light distribution pattern PA2A, thereby enhancing the calling attention function to the surroundings.

Further, in the present embodiment, the first light control unit is configured by the movable shade 1020 configured to be able to adopt the light-shielding position and the light-shielding release position. Therefore, it is possible to selectively form the first light distribution pattern PA1A and the second light distribution pattern PA2A with a simple configuration.

Furthermore, in the present embodiment, the second light control unit is configured by the deflection lens 1028 fixed to the movable shade 1020. Therefore, the formation position of the second light distribution pattern PA2A can be displaced downward with a simple configuration.

In the second embodiment, the movable shade 1020 is configured to be able to adopt the light control position and the retracted position by the pivotal movement in the front and rear direction. However, the pivotal movement in the right and left direction may be adopted, or linear reciprocating movement in the upper and lower direction or in the right and left direction may be adopted, instead of the pivotal movement.

In the second embodiment, the vehicle lamp 1010 is configured to form the low-beam light distribution pattern PL of left light distribution. However, also when the vehicle lamp 1010 is configured to form a low-beam light distribution pattern of right light distribution or is configured to form a light distribution pattern having only a horizontal cutoff line at its upper end portion, the same operational effects can be obtained by adopting the same configurations as those of the second embodiment.

Next, modifications of the second embodiment will be described.

First, a first modification of the second embodiment will be described.

Figure 18:
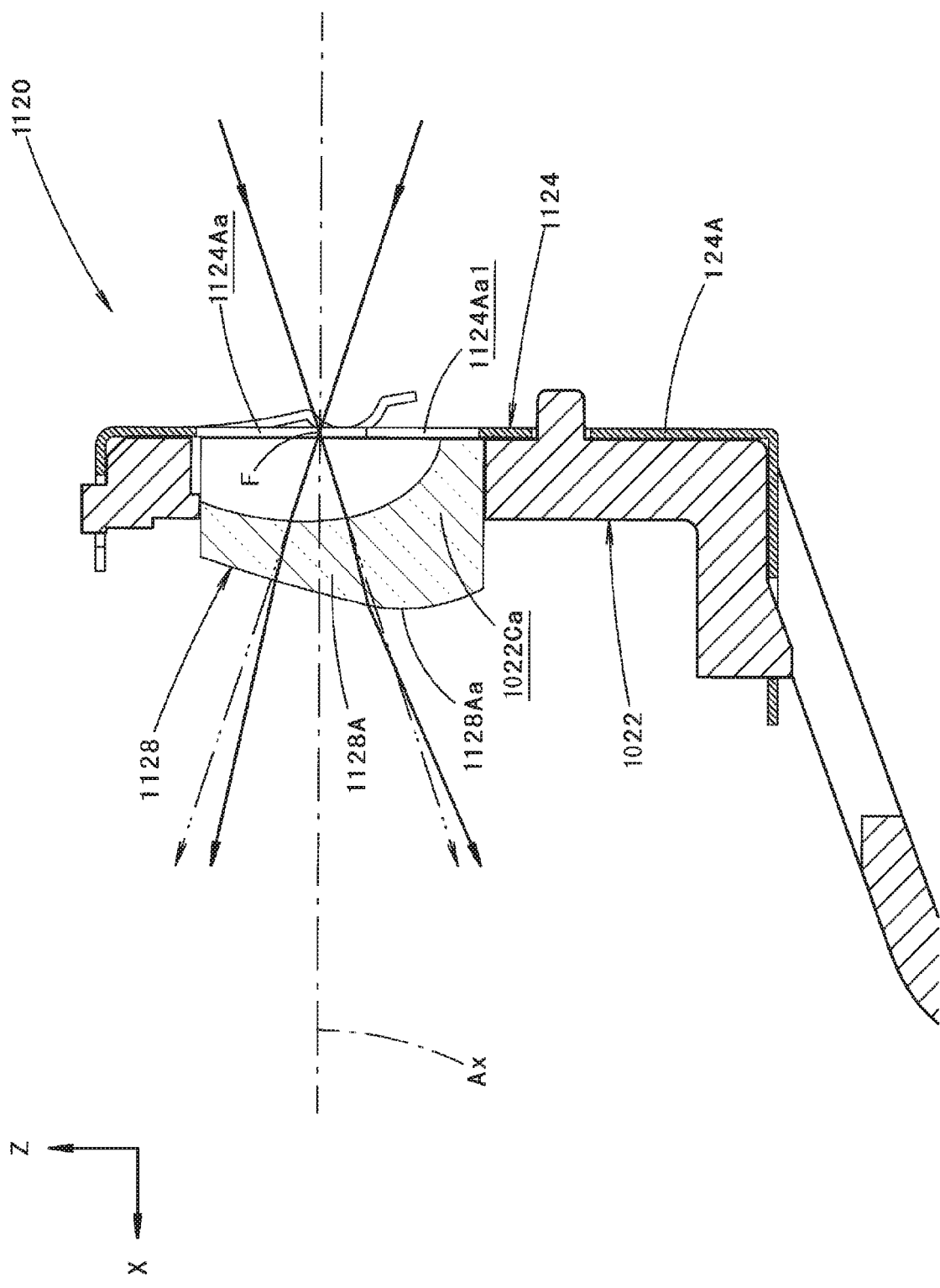
FIG. 18 is a view similar to FIG. 14, showing a main part of a vehicle lamp according to a first modification of the second embodiment.

FIG. 18 is a view similar to FIG. 14, showing a main part of a vehicle lamp according to the present modification.

As shown in FIG. 18, a basic configuration of the present modification is similar to that of the second embodiment, but the configurations of a shade body 1124 and a deflection lens 1128 of a movable shade 1120 are different from those of the second embodiment.

Figure 19A:
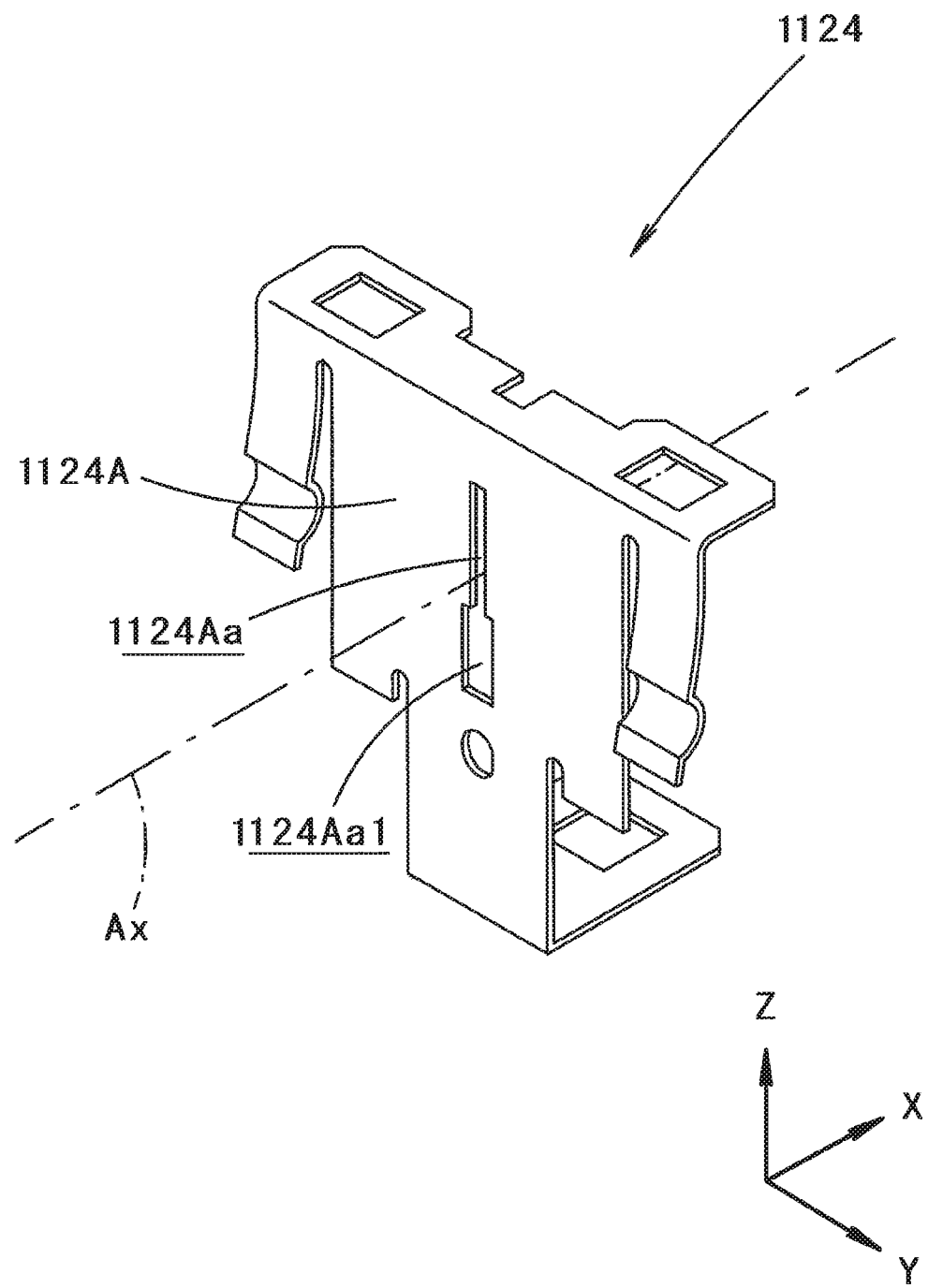
FIG. 19A is a perspective view showing a shade body of the first modification as a single item.

FIG. 19A is a perspective view showing the shade body 1124 of the present modification as a single item.

As shown in FIGS. 18 and 19A, a basic configuration of the shade body 1124 of the present modification is also similar to that of the shade body 1024 of the second embodiment, and a slit 1124Aa extending in the upper and lower direction is formed at the center portion of a vertical surface portion 1124A thereof in the right and left direction. The shape of the slit 1124Aa is different from that of the second embodiment.

That is, in the shade body 1024 of the second embodiment, the slit 1024Aa is formed in a longitudinally elongated rectangular shape with a constant lateral width. However, in the shade body 1124 of the present modification, a lower region 1124Aa1 of the slit 1124Aa is formed wider than the slit 1024Aa of the second embodiment.

Specifically, the slit 1124Aa of the shade body 1124 is formed to have substantially the same height as the vertical width of the deflection lens 1128 and is slightly longer in the lower side region than in the upper side region with respect to the optical axis Ax. Further, the lateral width of the slit 1124Aa is set to about 1 to 3 mm (e.g., about 2 mm) in a general region other than the lower region 1124Aa1, but is set to about 4 to 6 mm (e.g., about 5 mm) in the lower region 1124Aa1. The position of an upper end edge of the lower region 1124Aa1 is set to a position slightly below the optical axis Ax.

Further, as shown in FIG. 18, a basic configuration of the deflection lens 1128 of the present modification is similar to that of the deflection lens 1028 of the second embodiment, but the vertical cross-sectional shape of a lens body portion 1128A thereof is different from that of the second embodiment.

That is, the deflection lens 1128 of the present modification is also configured to deflect light reflected from the reflector 1016 to the lower side by a certain angle, but the downward deflection amount at that time is set to a value slightly smaller than that of the above embodiment. Specifically, the downward deflection amount is set to about 1 to 2° (e.g., about 1.5°).

In order to realize this, the lens body portion 1128A has a front surface 1128Aa formed in a convex curved surface shape, and a region below the optical axis Ax is configured by a curved surface greatly bulging forward. However, the degree of bulging is smaller than that of the lens body portion 1028A of the second embodiment.

Figure 20A:
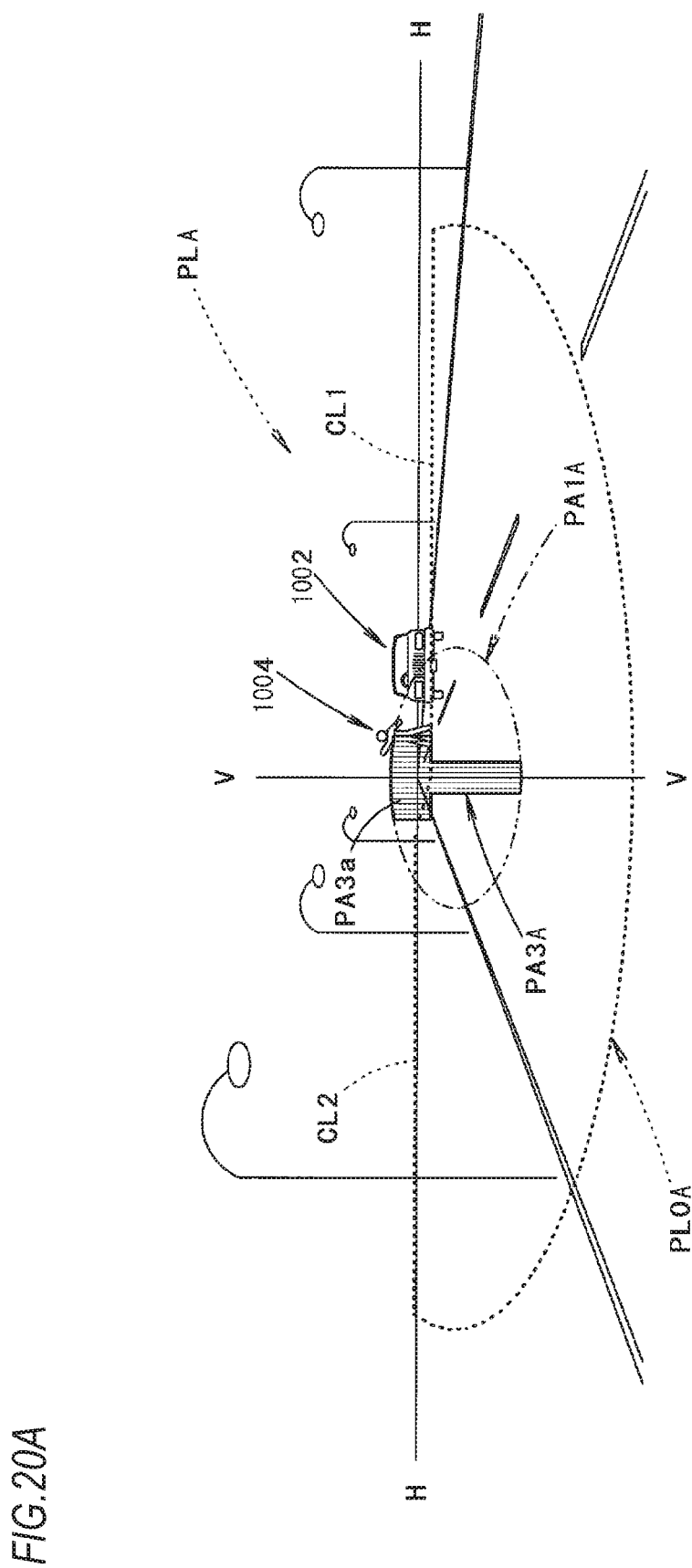
FIG. 20A is a view similar to FIG. 17B, showing an operation of the first modification.

FIG. 20A is a view perspectively showing a second light distribution pattern PA3A formed on the virtual vertical screen when the movable shade 1120 is in the light-shielding position.

The second light distribution pattern PA3A is formed such that its upper region PA3a bulges to both right and left sides at a position displaced slightly upward from the second light distribution pattern PA2A of the second embodiment. The downward displacement amount of the second light distribution pattern PA3A with respect to the first light distribution pattern PA1A shown in FIG. 17A is about 1 to 2° (e.g., about 1.5°). The lateral width of the second light distribution pattern PA3A is about 1 to 3° (e.g., about 2°) in a region other than the upper region PA3a, and is about 4 to 6° (e.g., about 5°) in the upper region PA3a.

When such a second light distribution pattern PA3A is formed in the low-beam light distribution pattern PLA, similar to the second light distribution pattern PA2A of the second embodiment, a band of light linearly extending forward can be generated as a road surface drawing on the road surface in front of the vehicle, thereby enhancing the calling attention function to the surroundings.

Moreover, the second light distribution pattern PA3A is displaced slightly upward from the second light distribution pattern PA2A of the second embodiment and the upper region PA3a thereof is formed to protrude to both right and left sides. Therefore, the distant visibility can be improved as compared with the case of the second embodiment.

For example, as shown in FIG. 17A, when there is a pedestrian 1004 crossing the road surface in front of the vehicle behind an oncoming vehicle 1002, it is difficult to find the pedestrian 1004 due to light irradiated from a headlamp of the oncoming vehicle 1002. However, since the upper region PA3a of the second light distribution pattern PA3A is irradiated to the pedestrian 4, it is easy to find the pedestrian 1004. Further, since light is irradiated to the body of the pedestrian 1004, the pedestrian 1004 can easily recognize that a vehicle is approaching.

Next, a second modification of the second embodiment will be described.

Figure 19B:
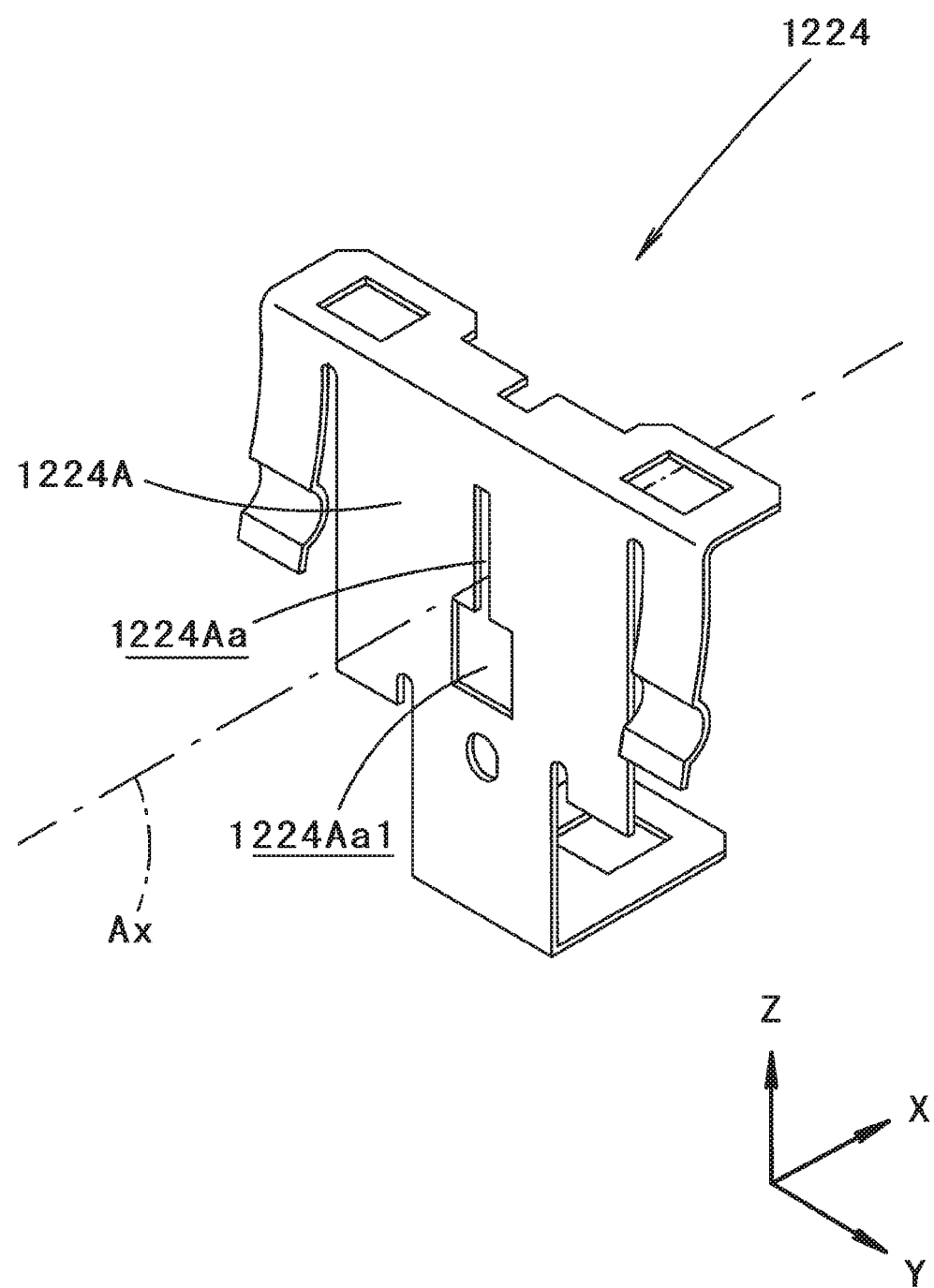
FIG. 19B is a perspective view showing a shade body of the second modification of the second embodiment as a single item.

FIG. 19B is a perspective view showing a shade body 1224 of the present modification as a single item.

As shown in FIG. 19B, a basic configuration of the present modification is similar to that of the first modification of the second embodiment. However, in the shade body 1224 of the present modification, a lower region 1224Aa1 of a slit 1224Aa formed at the center of a vertical surface portion 1224A in the right and left direction is formed wider than the lower region 1124Aa1 of the slit 1124Aa in the shade body 1124 of the first modification of the second embodiment. Specifically, the lateral width of the lower region 1224Aa1 is set to about 7 to 9 mm (e.g., about 8 mm).

Figure 20B:
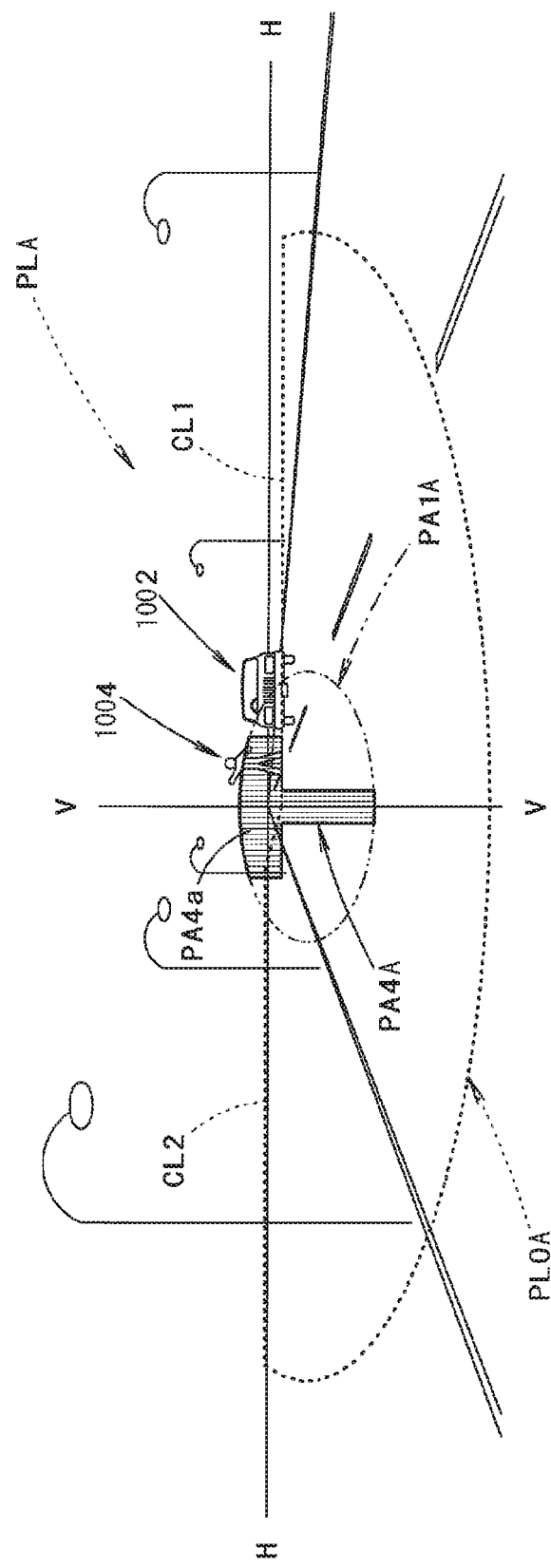
FIG. 20B is a view similar to FIG. 17B, showing an operation of the second modification.

In this way, as shown in FIG. 20B, a second light distribution pattern PA4A formed on the virtual vertical screen when a movable shade (not shown) is in the light-shielding position is formed such that its upper region PA4a bulges further to both right and left sides than the upper region PA3a of the second light distribution pattern PA3A in the first modification of the second embodiment. The lateral width of the upper region PA4a of the second light distribution pattern PA4A is about 7 to 9° (e.g., about 8°).

When such a second light distribution pattern PA4A is formed in the low-beam light distribution pattern PLA, the distant visibility can be further improved as compared with the case of the first modification of the second embodiment.

Next, a third modification of the second embodiment will be described.

Figure 21:
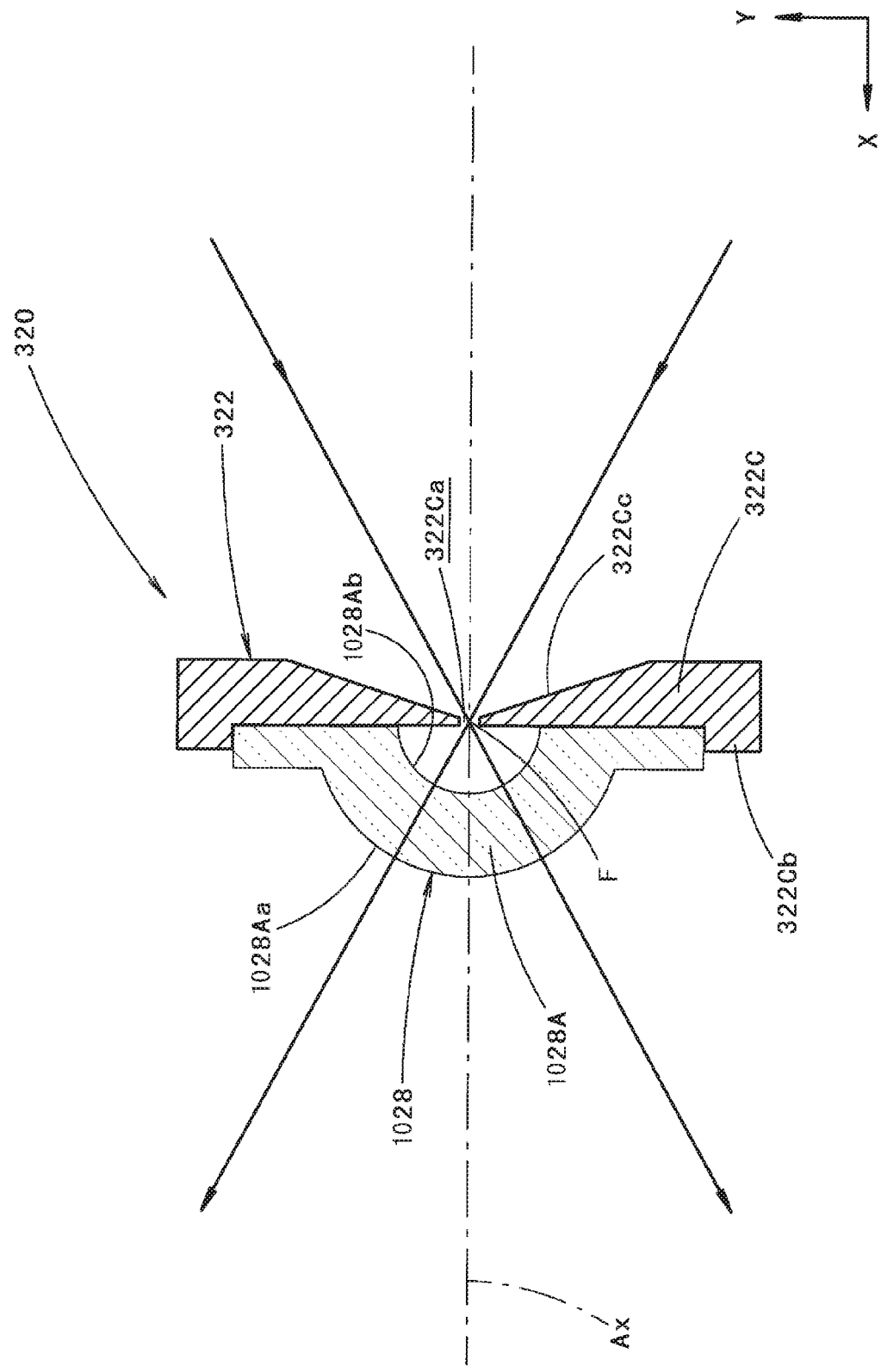
FIG. 21 is a view similar to the main part of FIG. 13, showing a movable shade of a third modification of the second embodiment.

FIG. 21 is a view similar to the main part of FIG. 13, showing a movable shade 320 of the present modification.

As shown in FIG. 21, a basic configuration of the present modification is similar to that of the second embodiment, but a shade holder 322 of the movable shade 320 of the present modification has the function of the shade holder 1022 and the function of the shade body 1024 in the second embodiment.

That is, in the movable shade 320, a slit 322Ca is formed in an upright wall portion 322C of the die-cast shade holder 322.

The slit 322Ca is formed in the same opening shape and at the same position as the slit 1024Aa of the shade body 1024 of the second embodiment.

In the movable shade 320 of the present modification, a rear surface of the deflection lens 1028 is fixed to a front surface of the upright wall portion 322C of the shade holder 322 by adhesion or the like.

A protrusion 322Cb for positioning the deflection lens 1028 is formed on an outer peripheral edge portion of the upright wall portion 322C so as to protrude toward the front. Further, both right and left regions of the slit 322Ca on the rear surface of the upright wall portion 322C are formed as inclination surfaces 322Cc inclined to the front side toward the slit 322Ca. In this way, the thickness of the upright wall portion 322C at the position of the side end edge facing the slit 322Ca is reduced to the same thickness as the plate thickness of the shade body 24 of the above embodiment, thereby preventing light reflected from a reflector (not shown) from being inadvertently shielded.

Also in the case of adopting the configuration of the present modification, the same operational effects as those of the second embodiment can be obtained.

Further, it is possible to reduce the number of parts by adopting the configuration of the present modification.

Meanwhile, the numerical values described as the specifications in the above embodiments and modifications thereof are merely examples, and it goes without saying that these numerical values may be set to different values as appropriate.

Further, the disclosure is not limited to the configurations described in the above embodiments and modifications thereof, and it is possible to adopt a configuration added with various other modifications.

While the disclosure includes a limited number of embodiments, those skilled in the art, having benefit of this disclosure, will appreciate that other embodiments can be devised. Accordingly, the scope of the invention should be limited only by the attached claims.

The invention claimed is:

1. A vehicle lamp comprising:
a projection lens; and
a light source disposed behind the projection lens,
wherein the vehicle lamp is configured to form a required light distribution pattern by irradiating light emitted from the light source forward through the projection lens,
wherein a movable lens configured to be movable in a required direction intersecting with an optical axis of the projection lens is disposed between the projection lens and the light source, and
wherein a maximum luminous intensity position of the light distribution pattern is changed by moving the movable lens in the required direction,
wherein a spot-like light distribution pattern is formed as the required light distribution pattern,
wherein the light distribution pattern has:
a first light distribution pattern formed when the movable lens is in a retracted position in which the movable lens is retracted from the optical axis; and
a second light distribution pattern when the movable lens is in a light control position in which the movable lens is on the optical axis,
wherein the first light distribution pattern is a light distribution pattern formed around a vanishing point in the front direction of the lamp, wherein the vanishing point is a center point of the front direction of the lamp, and
wherein the second light distribution pattern is a light distribution pattern obtained by displacing the first light distribution pattern.

2. The vehicle lamp according to claim 1,
wherein a spot-like light distribution pattern is formed as the required light distribution pattern.

3. The vehicle lamp according to claim 1,
wherein the maximum luminous intensity position is changed in a right and left direction by a movement of the movable lens.

4. The vehicle lamp according to claim 1,
wherein a shade configured to shield a part of light which is emitted from the light source and which is directed to the movable lens is fixed to the movable lens.

5. The vehicle lamp according to claim 4,
wherein a longitudinally elongated slit is formed in the shade.

6. The vehicle lamp according to claim 1, further comprising:
a reflector configured to reflect light emitted from the light source toward the projection lens,
wherein the reflector is configured to reflect light emitted from the light source toward a vicinity of a rear focus point of the projection lens.

7. A vehicle lamp comprising:
a projection lens; and
a light source disposed behind the projection lens,
wherein the vehicle lamp is configured to form a first light distribution pattern by irradiating light emitted from the light source forward through the projection lens,
wherein a first light control unit configured to be able to shield a part of light which is emitted from the light source and which is directed to the projection lens is disposed between the projection lens and the light source,
wherein a second light distribution pattern having a lateral width smaller than a lateral width of the first light distribution pattern is formed by a light-shielding action of the first light control unit, and
wherein the vehicle lamp comprises a second light control unit configured to displace a formation position of the second light distribution pattern downward when a light-shielding by the first light control unit is performed.

8. The vehicle lamp according to claim 7,
wherein a spot-like light distribution pattern is formed as the first light distribution pattern.

9. The vehicle lamp according to claim 7,
wherein a longitudinally elongated band-like light distribution pattern in which both right and left side portions of the first light distribution pattern are cut off is formed as the second light distribution pattern.

10. The vehicle lamp according to claim 9,
wherein a light distribution pattern in which a lateral width of an upper region is larger than a lateral width of a lower region is formed as the longitudinally elongated band-like light distribution pattern.

11. The vehicle lamp according to claim 7,
wherein the first light control unit is configured by a movable shade, and the movable shade is configured to be able to adopt a light-shielding position in which the light-shielding is performed and a light-shielding release position in which the light-shielding is released.

12. The vehicle lamp according to claim 11, wherein the second light control unit is configured by a deflection lens fixed to the movable shade.

* * * * *